US007415591B1

(12) United States Patent
Todd et al.

(10) Patent No.: US 7,415,591 B1
(45) Date of Patent: *Aug. 19, 2008

(54) METHOD AND APPARATUS FOR MIGRATING DATA AND AUTOMATICALLY PROVISIONING A TARGET FOR THE MIGRATION

(75) Inventors: Stephen J. Todd, Shrewsbury, MA (US); Steven M. Blumenau, Holliston, MA (US); Zoran Cakeljic, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 295 days.

This patent is subject to a terminal disclaimer.

(21) Appl. No.: 10/421,239

(22) Filed: Apr. 23, 2003

(51) Int. Cl.
*G06F 13/14* (2006.01)

(52) U.S. Cl. ...................... 711/170; 711/165

(58) Field of Classification Search ............... 711/161, 711/162, 165; 707/201, 202, 203, 204; 714/6
See application file for complete search history.

(56) References Cited

U.S. PATENT DOCUMENTS

| 5,544,347 | A | 8/1996 | Yanai et al. |
| 5,548,711 | A | 8/1996 | Brant et al. |
| 5,680,640 | A | 10/1997 | Ofek et al. |
| 5,742,792 | A | 4/1998 | Yanai et al. |
| 5,822,531 | A | 10/1998 | Gorczyca et al. |
| 5,870,545 | A | 2/1999 | Davis et al. |
| 5,896,548 | A | 4/1999 | Ofek |
| 6,058,054 | A | 5/2000 | Islam et al. |
| 6,065,077 | A | 5/2000 | Fu |
| 6,078,990 | A | 6/2000 | Frazier |
| 6,108,748 | A | 8/2000 | Ofek et al. |
| 6,145,066 | A | 11/2000 | Atkin |
| 6,161,218 | A | 12/2000 | Taylor |

(Continued)

FOREIGN PATENT DOCUMENTS

WO   WO 01/98889 A2 * 12/2001
WO   WO 02/03203 A2 *  1/2002

OTHER PUBLICATIONS

U.S. Appl. No. 10/122,556, filed Apr. 15, 2002, Todd et al.

(Continued)

*Primary Examiner*—B. James Peikari
(74) *Attorney, Agent, or Firm*—Krishnendu Gupta; Penelope S. Wilson

(57) ABSTRACT

Methods and apparatus for migrating a logical object. In one embodiment, a migration is performed by automatically determining the source location(s) of the logical object, moving the data stored therein to a target location while maintaining the availability of the data at the source location to an application program, and automatically servicing access requests from the application program at the target location after moving the data. In another embodiment, a migration is performed by automatically provisioning target location(s) to store a logical object, moving the data in the logical object to the target location(s) while maintaining its availability to an application program, and automatically servicing access requests from the application program at the target location after moving the data. In a further embodiment, a migration is performed by moving the data within a logical object from a source logical volume to a target logical volume, automatically servicing access requests from an application program at the target logical volume after moving the data, and retiring the source logical volume.

69 Claims, 16 Drawing Sheets

U.S. PATENT DOCUMENTS

| | | | |
|---|---|---|---|
| 6,173,377 B1 | 1/2001 | Yanai et al. | |
| 6,216,202 B1 | 4/2001 | D'Errico | |
| 6,233,607 B1 | 5/2001 | Taylor et al. | |
| 6,240,486 B1 | 5/2001 | Ofek et al. | |
| 6,266,784 B1 | 7/2001 | Hsiao et al. | |
| 6,356,977 B2 | 3/2002 | Ofek et al. | |
| 6,356,997 B1 | 3/2002 | Krishnan et al. | |
| 6,367,075 B1 | 4/2002 | Kruger et al. | |
| 6,370,626 B1 | 4/2002 | Gagne et al. | |
| 6,434,637 B1 | 8/2002 | D'Errico | |
| 6,523,036 B1 | 2/2003 | Hickman et al. | |
| 6,542,909 B1 | 4/2003 | Tamer et al. | |
| 6,564,336 B1 | 5/2003 | Majkowski | |
| 6,598,134 B2 | 7/2003 | Ofek et al. | |
| 6,631,477 B1 | 10/2003 | LeCrone et al. | |
| 6,640,278 B1 | 10/2003 | Nolan et al. | |
| 6,665,812 B1 | 12/2003 | Blumenau et al. | |
| 6,691,245 B1 | 2/2004 | DeKoning | |
| 6,704,838 B2 | 3/2004 | Anderson | |
| 6,745,303 B2 * | 6/2004 | Watanabe | 711/161 |
| 6,760,828 B1 | 7/2004 | Black | |
| 6,832,289 B2 | 12/2004 | Johnson | |
| 6,874,046 B1 | 3/2005 | LeCrone et al. | |
| 2002/0049776 A1* | 4/2002 | Aronoff et al. | 707/200 |
| 2002/0055941 A1 | 5/2002 | Patterson | |
| 2002/0056031 A1 | 5/2002 | Skiba et al. | |
| 2002/0133737 A1 | 9/2002 | Novick | |
| 2002/0133746 A1 | 9/2002 | Chen et al. | |
| 2003/0009707 A1 | 1/2003 | Pedone et al. | |
| 2003/0014523 A1 | 1/2003 | Teloh et al. | |
| 2003/0115434 A1 | 6/2003 | Mahalingam et al. | |
| 2003/0188218 A1 | 10/2003 | Lubbers et al. | |
| 2003/0217119 A1 | 11/2003 | Raman et al. | |
| 2003/0229764 A1 | 12/2003 | Ohno et al. | |
| 2004/0024975 A1 | 2/2004 | Morishita et al. | |
| 2004/0034628 A1 | 2/2004 | Numao et al. | |
| 2004/0139237 A1 | 7/2004 | Rangan et al. | |
| 2004/0215845 A1 | 10/2004 | Davani et al. | |

OTHER PUBLICATIONS

U.S. Appl. No. 10/211,469, filed Aug. 2, 2002, Blumenau.
U.S. Appl. No. 10/283,908, filed Oct. 30, 2002, Bober et al.
U.S. Appl. No. 10/315,791, filed Dec. 10, 2002, Todd.
U.S. Appl. No. 10/421,097, filed Apr. 23, 2003, Todd et al.
U.S. Appl. No. 10/421,252, filed Apr. 23, 2003, Todd et al.
U.S. Appl. No. 10/421,478, filed Apr. 23, 2003, Todd et al.
U.S. Appl. No. 10/281,524, filed Oct. 28, 2002, Blumenau et al.
U.S. Appl. No. 10/315,472, filed Dec. 10, 2002, Todd.
U.S. Appl. No. 10/353,322, filed Jan. 29, 2003, Blumenau et al.
U.S. Appl. No. 10/421,401, filed Apr. 23, 2003, Fox et al.
U.S. Appl. No. 10/421,500, filed Apr. 23, 2003, Blumenau et al.
Blunden M., et al., "Storage Networking Virtualization What's it all about", Dec. 2000 IBM Redbooks.
Khattar R., "Introduction to Storage Area Network, SAN", Aug. 1999, IBM.
Pabst, Thomas, "Fast and inexpensive—Promise's FastTrak66 IDE RAID-Controller." Mar. 29, 2000. Tom's Hardware http://.tomshardware.com/storage/20000329/fastrak66-02.html>.
Patterson, David A. et al. "A Case for Redundant Arrays of Inexpensive Disks (RAID)", ACM 0-89791-268-3/88/0006/0109, 1998, pp. 109-116.
"Promise Milestone." 2005 http://www.promise.com/company/about/prms_milestone_eng.asp.
"Redundant array of independent disks." Wikipedia: The Free Encyclopedia. Nov. 10, 2005 <http://en.wikipedia.org/wiki/Redundant_array_of_inexpensive_disks>.

* cited by examiner

METHOD AND APPARATUS FOR MIGRATING DATA AND AUTOMATICALLY PROVISIONING A TARGET FOR THE MIGRATION

FIELD OF THE INVENTION

This invention relates generally to the field of computer systems, and more particularly, to methods and apparatus for migrating data in a computer system.

DESCRIPTION OF THE RELATED ART

Many computer systems include one or more host computers, and one or more storage systems that store data used by the host computers. An example of such a computer system including a host computer 1 and two storage systems 3 and 4 is shown in FIG. 1.

The storage systems 3, 4 include a plurality of disk drives (5a-5b or 6a-6b) and a plurality of disk controllers (7a-7b or 8a-8b) that respectively control access to the disk drives. A plurality of storage bus directors (9, 10) control communication with host computer 1 over communication buses (17, 18). Each storage system 3, 4 further includes a cache 11, 12 to provide improved storage system performance. In particular, when the host computer 1 executes a read from one of the storage systems 3, 4, the storage system may service the read from its cache 11, 12 (when the data is stored in the cache) rather than from one of the disk drives 5a-5b or 6a-6b to execute the read more efficiently. Similarly, when the host computer 1 executes a write to one of the storage systems 3, 4, corresponding storage bus directors 9,10 can execute the write to the cache 11, 12. Thereafter, the data can be de-staged asynchronously in a manner transparent to the host computer 1 to the appropriate one of the disk drives 5a-5b, 6a-6b. Finally, storage systems 3, 4 include internal buses 13, 14 over which storage bus directors 9, 10, disk controllers 7a-7b, 8a-8b and caches 11, 12 communicate.

The host computer 1 includes a processor 16 and one or more host bus adapters 15 that each controls communication between the processor 16 and one of the storage systems 3, 4 via a corresponding one of the communication buses 17, 18. It should be appreciated that rather than a single processor 16, host computer 1 can include multiple processors. Each bus 17, 18 can be any of a number of different types of communication links, with the host bus adapter 15 and storage bus directors 9, 10 being adapted to communicate using an appropriate protocol for the communication buses 17, 18 coupled therebetween. For example, each of the communication buses 17, 18 can be implemented as a SCSI bus with the directors 9, 10 and adapters 15 each being a SCSI driver. Alternatively, communication between the host computer 1 and the storage systems 3, 4 can be performed over a Fibre Channel fabric.

Typically, the storage systems 3,4 make storage resources available to the host computer for assignment to entities therein, such as a file system, database manager or logical volume manager. If the storage systems are so-called "dumb" storage devices, the storage resources made available to the host computer will correspond in a one-two-one relationship to physical storage devices within the storage systems. However, when the storage systems are intelligent storage systems, they will present logical volumes of storage to the host computer that need not necessarily correspond in a one-to-one relationship to any physical storage devices within the storage system, as the intelligent storage systems may map each logical volume of storage presented to the host across one or more physical storage devices.

Administrators of computer systems like that depicted in FIG. 1 often find it desirable to migrate sets of logically related data, such as a database or file system, from one storage resource to another. One common reason is that a data set is expanding at such a rate that it will soon exceed the capacity of a storage system. Other common reasons include the administrator's desire to move the data set to a storage system with faster response time, to lay the data set out differently on the resource to facilitate faster access, to reconfigure disk striping for fault tolerance and/or performance purposes, or to optimize the geographic location where the data set is physically stored.

Data migrations are often complicated and problematic exercises. Administrators usually must take offline any applications executing on the host computer 1 that access the data set. Depending on the size of the data set, applications can be offline for lengthy periods, leading to a loss of productivity, and opportunity cost associated with not having the data set available for important business functions. Migrations typically are manual labor-intensive efforts, and are therefore error-prone, costly and involve redirecting human resources to the migration.

Conventional data migration efforts typically involve the following four separate steps, requiring manual intervention between each: source discovery, target provisioning, data synchronization (i.e., movement), and reconfiguration to switch to target access.

The source discovery step identifies the physical locations (e.g., the storage system and logical volume) at which the data set is stored. This step is typically performed manually. An exemplary conventional method includes the use of spreadsheets to compile an inventory of file systems, database table spaces, and other data stored on individual storage volumes.

The target provisioning step identifies and configures the storage resources (typically logical volumes of storage presented by another storage system) to which the data set will be moved. Conventionally, this step requires extensive manual intervention by, for example, database administrators and system administrators. This step may include making new logical volumes visible to one or more host computers, mapping file systems and/or table spaces on target logical volumes, configuring switches, configuring volumes for redundancy, and planning for more efficient physical data access. This step is typically very time-consuming and labor-intensive, and thus expensive.

The synchronization step involves actually moving or copying the data set from the source locations to the target locations. Various techniques have been used to perform this step, including employing a utility application running on one or more host computers to read the data set from the source locations and write the data set to the target locations. Alternatively, a mirroring facility, such as the Symmetrix Remote Data Facility (SRDF) available from EMC Corporation, Hopkinton, Mass., may be used to create mirrors between source and target volumes on different storage systems and to then synchronize them so that the storage systems themselves perform the copy. Synchronization is often the most time consuming of the four steps, and usually requires that applications accessing the data be taken offline (i.e., refused access to the data) while the step is performed.

After the data set has been moved or copied, the switch to target step typically involves reconfiguring the computer system so that applications utilizing the data set recognize the target locations as the new storage location for the data set. Again, this conventionally requires human intervention and may require rebooting of the host computer(s) that access the data set.

SUMMARY OF THE INVENTION

In one embodiment, a method is provided for migrating a logical object, comprising a plurality of logically associated data elements, from at least one first storage location at which the logical object is stored to at least one second storage location, the logical object storing data accessible to an application program. The method comprises computer-implemented acts of (A) automatically determining the at least one first storage location at which the logical object is stored; (B) moving the data stored within the logical object from the at least one first storage location to the at least one second storage location; (C) after completion of the act (B), automatically servicing access requests from the application program directed to the logical object from the at least one second storage location; and (D) maintaining availability of the logical object to service access requests from the application program during the act (B).

In another embodiment, at least one computer-readable medium is provided which is encoded with at least one computer program that, when executed, performs a method of migrating a logical object, comprising a plurality of logically associated data elements, from at least one first storage location at which the logical object is stored to at least one second storage location, the logical object storing data accessible to an application program. The method comprises acts of (A) automatically determining the at least one first storage location at which the logical object is stored; (B) moving the data stored within the logical object from the at least one first storage location to the at least one second storage location; (C) after completion of the act (B), automatically servicing access requests from the application program directed to the logical object from the at least one second storage location; and (D) maintaining availability of the logical object to service access requests from the application program during the act (B).

In yet another embodiment, an apparatus is provided for migrating a logical object comprising a plurality of logically associated data elements from at least one first storage location at which the logical object is stored to at least one second storage location, wherein the logical object stores data accessible to an application program. The apparatus comprises at least one processor programmed to: automatically determine the at least one first storage location at which the logical object is stored; move the data stored within the logical object from the at least one first storage location to the at least one second storage location; after the move of the data stored within the logical object, automatically service access requests from the application program directed to the logical object from the at least one second storage location; and maintain the availability of the logical object to service access requests from the application program during the move of the data stored within the logical object.

In still another embodiment, a method is provided for migrating a logical object comprising a plurality of logically associated data elements from at least one first storage location at which the logical object is stored to at least one second storage location, the logical object storing data accessible to an application program. The method comprises computer-implemented acts of: (A) automatically provisioning the at least one second storage location to service the logical object; (B) moving the data stored within the logical object from the at least one first storage location to the at least one second storage location; (C) after completion of the act (B), automatically servicing access requests from the application program directed to the logical object from the at least one second storage location; and (D) maintaining availability of the logical object to service access requests from the application program during the act (B).

In still another embodiment, at least one computer-readable medium is provided with at least one computer program encoded thereon for performing a method of migrating a logical object comprising a plurality of logically associated data elements from at least one first storage location at which the logical object is stored to at least one second storage location, the logical object storing data accessible to an application program. The method comprises acts of: (A) automatically provisioning the at least one second storage location to service the logical object; (B) moving data stored within the logical object from the at least one first storage location to the at least one second storage location; (C) after completion of the act (B), automatically servicing access requests from the application program directed to the logical object from the at least one second storage location; and (D) maintaining availability of the logical object to service access requests from the application program during the act (B).

In still another embodiment, an apparatus is provided for migrating a logical object comprising a plurality of logically associated data elements from at least one first storage location at which the logical object is stored to at least one second storage location, the logical object storing data accessible to an application program. The apparatus comprises at least one processor programmed to: automatically provision the at least one second storage location to service the logical object; move the data stored within the logical object from the at least one first storage location to the at least second storage location; after the move of the data, automatically service access requests from the application program directed to the logical object from the at least one second storage location; and maintain availability of the logical object to service access requests from the application program during the move of the data.

In still another embodiment, a method is provided for migrating a logical object comprising a plurality of logically associated data elements from at least one first logical volume to at least one second logical volume in a computer system including at least one host computer and at least one storage system, each of the logical volumes being presented by the at least one storage system to the at least one host computer and each being perceived by the at least one host computer as corresponding to a physical storage device, the logical object storing data accessible to an application program executing on the at least one host computer. The method comprises computer-implemented acts of: (A) moving the data stored within the logical object from the at least one first logical volume to the at least one second logical volume; (B) after completion of the act (A), automatically servicing access requests from the application program directed to the logical object from the at least one second logical volume; (C) retiring the at least one first logical volume upon completion of the act (B); and (D) maintaining availability of the logical object to service access requests from the application program during the act (A).

In still another embodiment, at least one computer-readable medium is provided with at least one computer program encoded thereon for performing a method of migrating a logical object comprising a plurality of logically associated data elements from at least one first logical volume to at least one second logical volume in a computer system including at least one host computer and at least one storage system, each of the logical volumes being presented by the at least one storage system to the at least one host computer and each being perceived by the at least one host computer as corresponding to a physical storage device, the logical object storing data accessible to an application program executing on the at least one host computer. The method comprises computer-implemented acts of: (A) moving the data stored within the logical object from the at least one first logical volume to the at least one second logical volume; (B) after completion of act (A), automatically servicing access requests from the application program directed to the logical object from the at least one second logical volume; (C) retiring the at least one first logical volume upon completion of the act (B); and (D) maintaining availability of the logical object to service access requests from the application program during act (A).

In still another embodiment, an apparatus is provided for migrating a logical object comprising a plurality of logically associated data elements from at least one first logical volume to at least one second logical volume in a computer system including at least one host computer and at least one storage system, each of the logical volumes being presented by the at least one storage system to the at least one host computer and each being perceived by the at least one host computer as corresponding to a physical storage device, the logical object storing data accessible to an application program executing on the at least one host computer. The apparatus comprises at least one processor programmed to: move the data stored within the logical object from the at least one first logical volume to the at least one second logical volume; after completion of the move of the data, automatically service access requests from the application program directed to the logical object from the at least one second logical volume; retire the at least one first logical volume upon automatically servicing access requests from the application program directed to the logical object from the at least one second logical volume; and maintain availability of the logical object to service access requests from the application program during the move of the data.

Other illustrative embodiments of the invention are directed to a method of managing a migration of data set from at least one first storage location to at least one second storage location, wherein read requests to the data set from at least one application program executing on a computer system initially are serviced from the at least one first storage location, and a computer readable medium encoded with instructions that, when executed, perform the method. The method comprises acts of: (A) copying the data set from the at least one first storage location to the at least one second storage location; (B) after completion of the act (A), modifying at least one aspect of the computer system so that read requests to the data set are serviced from the at least one second storage location and not from the at least one first storage location to achieve the migration of the data set from the at least one first storage location to the at least one second storage location; and (C) after completion of the act (B), undoing the migration by modifying the at least one aspect of the computer system so that read requests to the data set are again serviced from the at least one first storage location and not from the at least one second storage location.

A further illustrative embodiment is directed to an apparatus for managing a migration of a data set from at least one first storage location to at least one second storage location, wherein read requests to the data set from at least one application program executing on a computer system initially are serviced from the at least one first storage location. The apparatus comprises at least one processor programmed to perform acts of: (A) copying the data set from the at least one first storage location to the at least one second storage location; (B) after completion of the act (A), modifying at least one aspect of the computer system so that read requests to the data set are serviced from the at least one second storage location and not from the at least one first storage location to achieve the migration of the data set form the at least one first storage location to the at least one second storage location; and (C) after completion of the act (B), undoing the migration by modifying the at least one aspect of the computer system so that read requests to the data set are again serviced from the at least one first storage location and not from the at least one second storage location.

Other illustrative embodiments of the invention are directed to a method of managing a migration of data set from at least one first storage location to at least one second storage location, wherein read requests to the data set from at least one application program executing on a computer system initially are serviced from the at least one first storage location, and a computer readable medium encoded with instructions that, when executed, perform the method. The method comprises acts of: (A) copying the data set from the at least one first storage location to the at least one second storage location; (B) after completion of the act (A), modifying at least one aspect of the computer system so that read requests to the data set are serviced from the at least one second storage location and not from the at least one first storage location to achieve the migration of the data set from the at least one first storage location to the at least one second storage location; and (C) after completion of the act (B), determining whether to finalize the migration.

A further illustrative embodiment is directed to an apparatus for managing a migration of a data set from at least one first storage location to at least one second storage location, wherein read requests to the data set from at least one application program executing on a computer system initially are serviced from the at least one first storage location. The apparatus comprises at least one processor programmed to perform acts of (A) copying the data set from the at least one first storage location to the at least one second storage location; (B) after completion of the act of (A), modifying at least one aspect of the computer system so that read requests to the data set are serviced from the at least one second storage location and not from the at least one first storage location to achieve the migration of the data set from the at least one first storage location to the at least one second storage location; and (C) after completion of the act (B), determining whether to finalize the migration.

Another illustrative embodiment is directed to a method of managing a request to open a first storage volume in a computer system, and a computer readable medium encoded with instructions for performing the method. The computer system includes at least one host computer having an entity thereon that issues the request to open the first storage volume and at least one storage system on which the first storage volume is stored. The method comprises an act of responding to the request by returning a handle for a second storage volume so that the second storage volume is opened rather than the first storage volume.

A further illustrative embodiment is directed to a host computer for use in a computer system that comprises the host computer and at least one storage system. The host computer comprises an entity that issues requests to open storage volumes; and at least one controller that responds to a request from the entity to open a first storage volume by returning to the entity a handle for a second storage volume so that the second storage volume is opened rather than the first storage volume.

Another illustrative embodiment is directed to a method of managing a request to open a first storage volume in a computer system, and a computer readable encoded with instructions for performing the method. The computer system including at least one host computer having an entity thereon that issues the request, on behalf of a user, to open the first storage volume and at least one storage system on which the first storage volume is stored. The method comprises acts of: (A) applying a policy that is independent of an identity of the user to determine whether to grant the request; (B) when it is determined in the act (A) that the policy is met, granting the request; and (C) when it is determined in the act (A) that the policy is not met, denying the request.

A further illustrative embodiment is directed to a host computer for use in a computer system that comprises the host computer and at least one storage system. The host computer comprises an entity that issues requests to open storage volumes; and at least one controller that responds to a request from the entity, on behalf of a user, to open a first storage volume by applying a policy that is independent of an identity of the user to determine whether to grant the request, and that grants the request when it determines that the policy is met and denies the request when it determines that the policy is not met.

Another illustrative embodiment is directed to a method of managing a request to open a first storage volume in a computer system, and a computer readable encoded with instructions for performing the method. The computer system includes at least one host computer having an entity thereon that issues the request to open the first storage volume and at least one storage system on which the first storage volume is stored, wherein the request is issued on behalf of a user of the host computer and seeks to open the first storage volume for performing at least one function. The method comprises acts of: (A) authenticating the user; (B) determining whether the user has authorization privileges necessary to perform the at least one function on the first storage volume; and (C) applying a policy that determines how to handle processing of the request.

A further illustrative embodiment is directed to a host computer for use in a computer system that comprises the host computer and at least one storage system. The host computer comprises an entity that issues requests to open storage volumes; and at least one controller that responds to a request from the entity to open a first storage volume, wherein the request is issued on behalf of a user of the host computer and seeks to open the first storage volume for performing at least one function. The at least one controller responds to the request by authenticating the user, determining whether the user has authorization privileges necessary to perform the at least one function on the first storage volume, and applying a policy that determines how to handle processing of the request.

DETAILED DESCRIPTION

Several embodiments of the present invention are directed to improved methods and apparatus for migrating data in a computer system. In accordance with one of these embodiments, various aspects of the migration process are automated, thereby reducing the need for human intervention and the associated costs, delay and potential for error associated therewith.

In accordance with another embodiment of the present invention, the data set being migrated need not be taken off line during the migration, thereby alleviating one of the major downsides to conventional migration techniques.

In accordance with yet another embodiment of the present invention, the ability is provided to "undo," or revert from, a migration. In this respect, and as discussed above, it should be appreciated that migrations are often prone to error. Occasionally, errors are not detected until after the data set has actually been moved, the system has been reconfigured and the applications that access the data set have been brought back on line. Unfortunately, using conventional techniques, by the time errors are detected it is often too late to undo the migration and revert back to a known good state for the system. In accordance with one aspect of the present invention, such a capability is provided.

Figure 2:
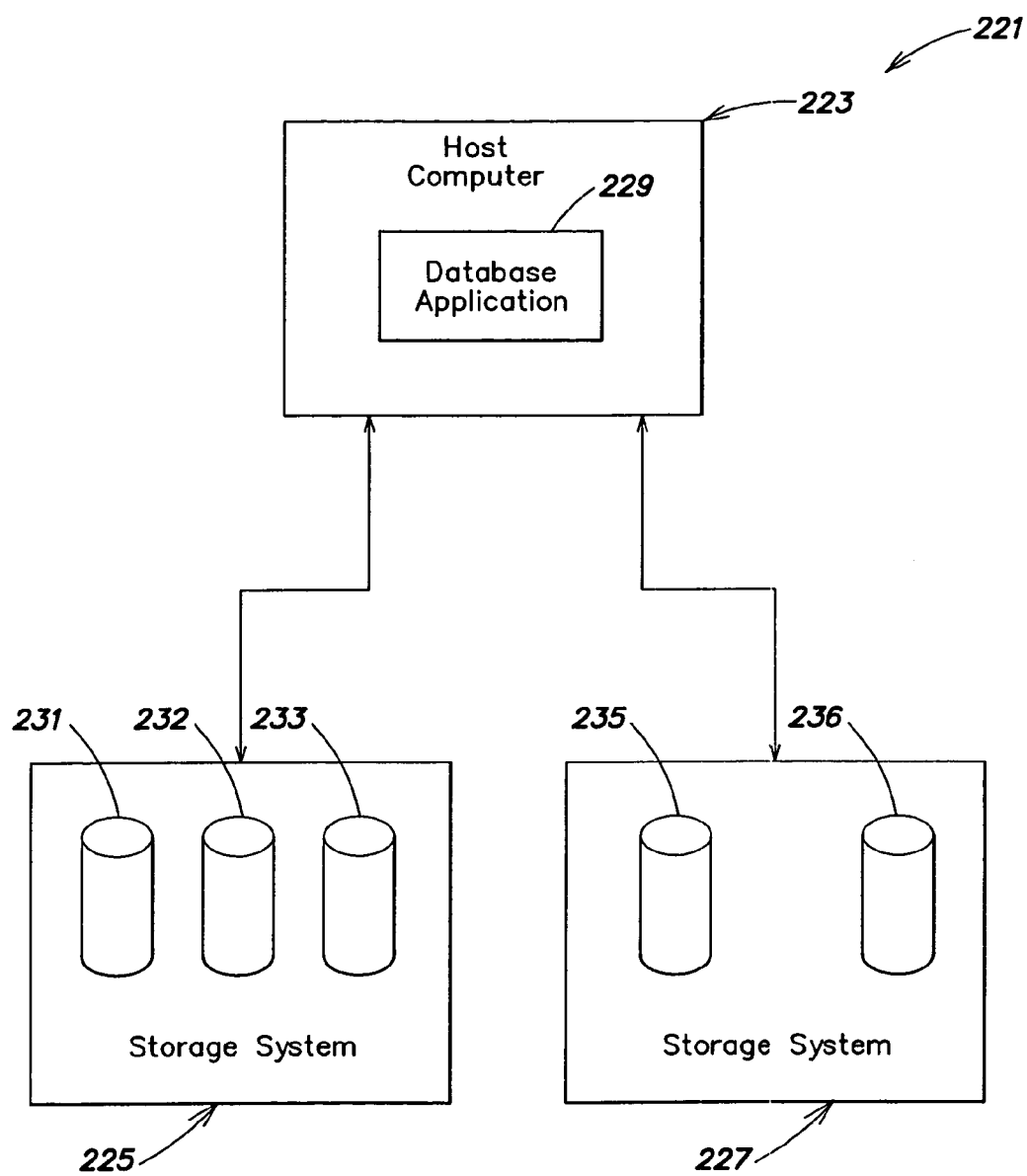
FIG. 2 is a block diagram of an exemplary database configuration for which a migration can be performed using aspects of the present invention.

One application for use with embodiments of the present invention will now be described referring to FIG. 2. FIG. 2 illustrates a computer system 221 that includes a host computer 223 and a pair of storage systems 225 and 227. The host computer has a database application 229 executing thereon that creates and manages a database stored among logical volumes 231-233 presented by the storage system 225 to the host computer 223. Although the database in this example is described as being stored among only three logical volumes for simplicity of explanation, it should be appreciated that many database installations will be significantly larger and more complex, and will include data stored among a far greater number of logical volumes.

Figure 1:
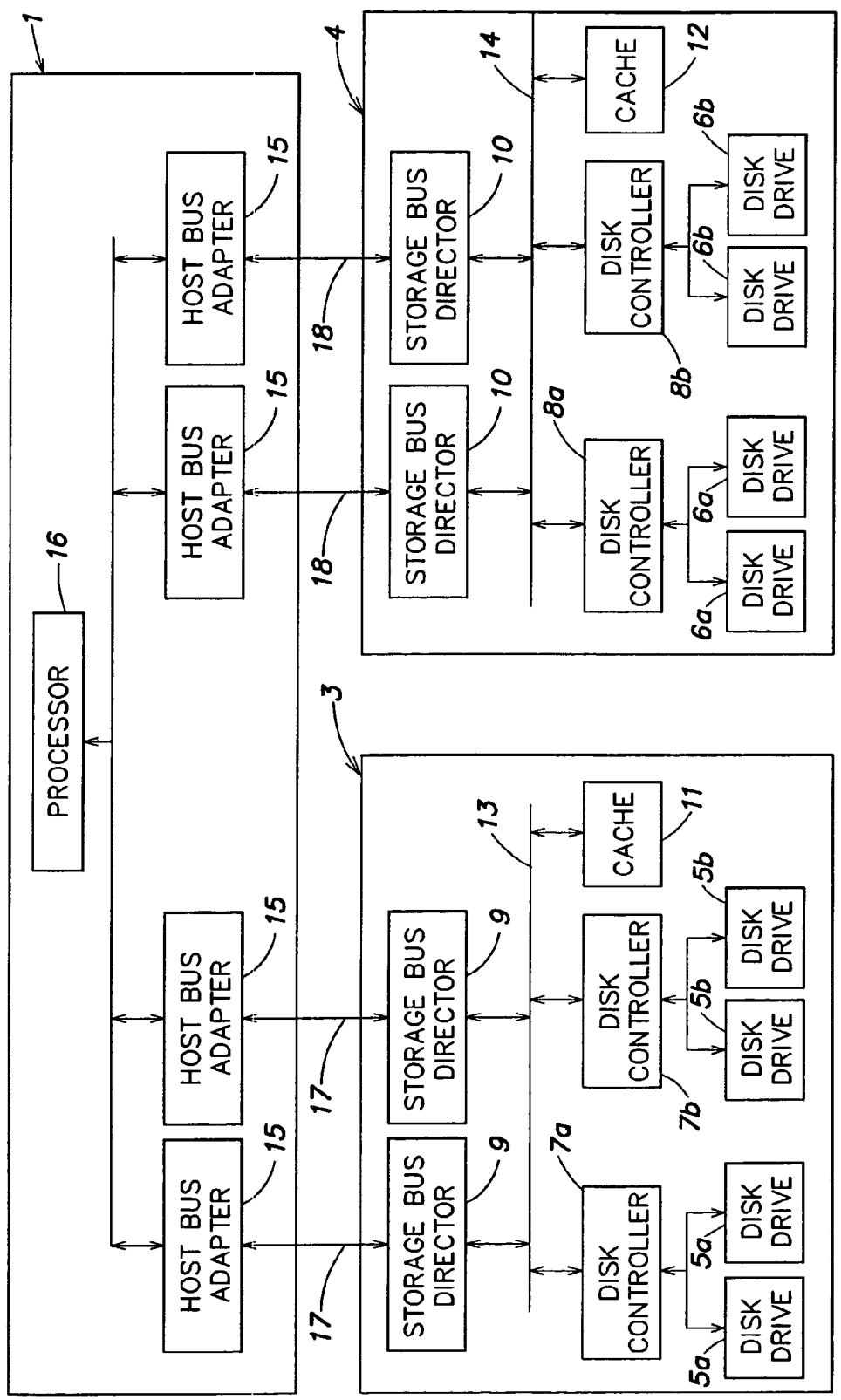
FIG. 1 is a block diagram of an exemplary computer system on which aspects of the present invention can be employed.

In the illustrative example shown in FIG. 2, the database managed by the database application 229 and stored among three logical volumes in storage system 225 is to be migrated and stored among two logical volumes 235-236 provided by the storage system 227. It should be appreciated that if the storage systems 225, 227 are not intelligent storage systems, the logical volumes 231-233 and 235-236 correspond to actual physical storage devices (e.g., the disk drives 5a-5b and 6a-6b in FIG. 1). However, if the storage systems 225, 227 are intelligent storage systems, the logical volumes may be mapped within the storage systems themselves among one or more physical storage devices in a conventional manner.

It should be appreciated from the example of FIG. 2 that when performing a migration in accordance with various embodiments of the present invention, a 1-to-1 migration of each logical volume is not required, as the data set can be provisioned across one or more target resources in any manner.

Figure 3:
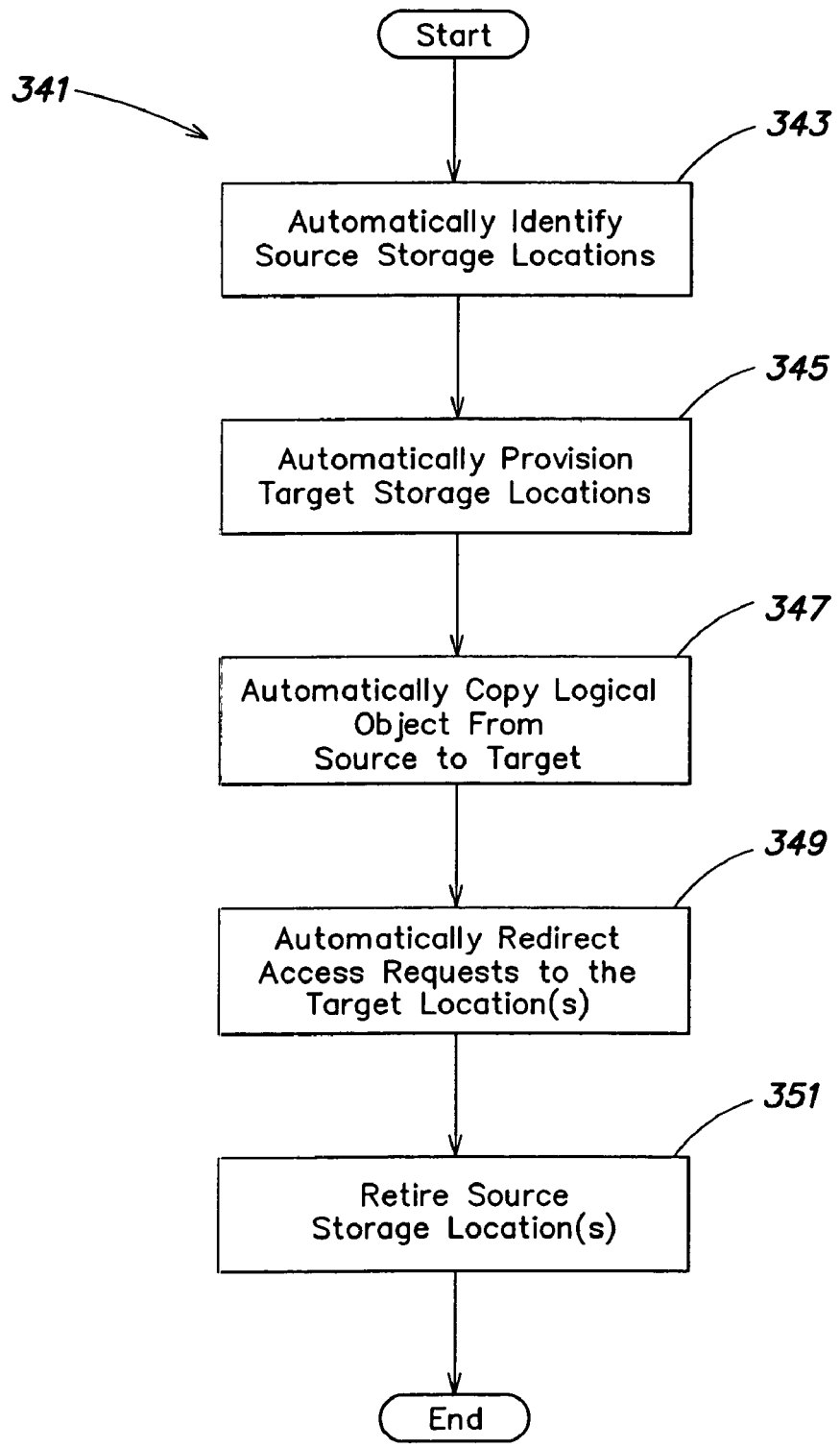
FIG. 3 is a flow diagram of a process used to migrate a logical object in accordance with one embodiment of the invention.

One embodiment of the present invention is directed to a process which automates the entire migration. An illustrative implementation of such a process will now be described referring to the example configuration of FIG. 2. The process 341, shown by the flow chart of FIG. 3, is initialized by a command to migrate the database. This command can be provided by a system administrator, or via a utility or other application executing on the host computer 223 or on any other computer within the computer system 221. In response, the process, in act 343, automatically identifies the source storage locations for the database. In the example of FIG. 2, the source storage locations include the logical volumes 231-233 on storage system 225. The present invention is not limited to any particular technique for performing this automatic identification, but one example of a technique for doing so is described below. It should be appreciated that in identifying the source storage locations, various levels of granularity are possible. For example, the source storage locations can be identified only to the logical volume level. However, in an alternate embodiment of the present invention, a lower level of granularity is achieved, and the source storage locations are identified by the specific blocks within a logical volume that are used to store the database (or other "logical object" as discussed below) to be migrated.

In act 345, the process also automatically provisions target storage locations for the database to be migrated. In the example shown in FIG. 2, the target storage locations are the logical volumes 235-236 in the storage system 227. As with the identification act 343, the provisioning act 345 can also be performed to varying levels of granularity, as the present invention is not limited to any particular granularity. Furthermore, the embodiments of the present invention described herein are not limited to any particular technique for performing automatic provisioning, but one example is described below. In this respect, the term provisioning is used herein to reference identifying available target storage resources and/or configuring them so that they can be used to receive the migrated database or other logical object.

Although the flow chart shown in FIG. 3 illustrates the identification of the source storage locations as being performed prior to the provisioning of the target storage locations, it should be appreciated that no relative ordering between these acts is required, and they can be done in any sequence or simultaneously.

In the act 347, the database (or more generically the logical object) is automatically moved from the source storage locations identified in the act 343 to the target storage locations provisioned in the act 345. The embodiments of the present invention described herein are not limited to any particular technique for performing this move operation, as numerous techniques are possible. Several examples are discussed below.

The act 347 is illustrated in FIG. 3 as being performed after the completion of acts 343 and 345. However, it should be appreciated that the present invention is not limited in this respect, as the act 347 can begin after at least some portions of the logical object are identified in act 343 and corresponding target storage locations are provisioned in act 345, even if all of the source storage locations for the logical object have not been identified and/or all of the target storage locations have not yet been provisioned.

In act 349, access requests directed to the source storage locations are automatically redirected to the target storage locations. Referring to the example of FIG. 2, assume that all of the blocks of storage that make up the database and were initially stored on logical volumes 231-232 are provisioned and moved to logical volume 235 on storage system 227. After the movement of the data has been completed in act 347, any access requests from the database application 229 directed to the volumes 231 and 232 can be automatically redirected to the logical volume 235. The embodiments of the present invention described herein are not limited to any particular redirection technique, but an example of one suitable technique is described below.

As used herein, reference to redirecting access requests to the target locations means that the database application 229 and any mapping layers associated therewith need not be reconfigured to recognize the logical volumes 235 and 236 as including portions of the database stored thereon. This advantageously enables the switching from the source storage locations to the target locations to occur without having to take the database application 229, or any other component of the host computer 223, offline to perform the switch.

As with the act 347 discussed above, although the act 349 of automatically redirecting is shown in FIG. 3 as being performed after the copying in act 347, it should be appreciated that the present invention is not limited in this respect, and that some access requests may be redirected before the entire logical object has been copied.

Finally, in act 351, the source storage locations (e.g., logical volumes 231-233 in FIG. 2) are retired. This is an optional aspect in accordance with one embodiment of the present invention, and is designed to avoid potential difficulty in the host computer 223 recognizing the existence of multiple copies of bodies of data, as discussed in more detail below.

It should be appreciated that in accordance with one embodiment of the present invention, not only is each of the acts discussed above in connection with FIG. 3 performed automatically, but the entire process is performed automatically. For example, in accordance with one embodiment of the present invention, the process is called with simply one command that identifies the database (or other logical object) to be migrated, and instructs that the migration be performed. Thus, one embodiment of the present invention performs each of the acts discussed above in connection with FIG. 3 automatically in response to the single command, such that manual intervention is not required to transition between any of the acts.

In the embodiment shown in FIG. 3, the entire migration is automated, which is obviously advantageous. However, the present invention is not limited in this respect, in that even automating less than the entire process provides significant advantages over conventional migration techniques, such that alternate embodiments of the present invention automate only a subset of the acts addressed in the process of FIG. 3.

In the illustrative embodiment discussed above in connection with the computer system 221 in FIG. 2, the data set is migrated from one storage system 225 to another 227. However, it should be appreciated that the present invention is not limited in this respect, and that the embodiments of the present invention disclosed herein can alternatively be employed to migrate data from source to target locations within a single storage system, or among multiple source and/or multiple target storage systems.

In the example discussed above, the data set migrated is a database. However, it should be appreciated that the embodiments of the present invention can be employed to migrate numerous other types of logically related data elements (also referred to herein as logical objects), such as files, file systems or any other logically related data set. Further, the invention is not limited to migrating a single set of logically related data elements, as multiple sets may be migrated at once.

It should be appreciated that one advantageous aspect of the embodiment of the present invention disclosed in FIG. 3 is that the data set need not be taken offline to perform the migration and can remain online for use by the applications that access the logical object. It should be appreciated that this advantageous aspect of one embodiment of the present invention is not limited to use with the particular process illustrated in FIG. 3.

As indicated above, the embodiment of the present invention shown in FIG. 3 is not limited to any particular implementation for any of the acts. Thus, the explanations provided below are merely exemplary, as any other suitable implementation techniques can alternatively be employed.

I. AUTOMATICALLY IDENTIFYING THE SOURCE LOCATIONS FOR THE LOGICAL OBJECT

One technique for automatically determining the storage locations for a logical object includes using an application programming interface referred to as SymmAPI-Mapper, available from EMC Corporation, Hopkinton, Mass. Furthermore, a technique for identifying the source locations of a logical object is provided in U.S. Pat. No. 6,542,909, entitled System for Determining Mapping of Logical Objects in a Computer System, issued Apr. 1, 2003, which is commonly assigned and is hereby incorporated herein by reference. In accordance with the technique described in that patent, an application programming interface can be provided that handles the determination of where the data blocks that comprise a logical object are stored among storage resources.

Additional techniques for automatically identifying the source locations for a logical object are described in commonly assigned co-pending U.S. patent application Ser. No. 10/283,908, entitled "Method and Apparatus for Provisioning Storage Resources", filed Oct. 30, 2002, which is hereby incorporated herein by reference. That application includes techniques for not only automatically identifying source locations, but also automatically provisioning target locations. Portions of that application as they relate to automatic source identification and automatic target provisioning will now be reiterated herein. It should be appreciated that the present invention is not limited to performing source discovery and target provisioning using the techniques described herein, as any suitable technique may be employed. Furthermore, while some embodiments of the present invention employ automatic source discovery and target provisioning, other embodiments of the present invention need not.

In one embodiment, automatic source identification (or "source discovery") is performed to identify the computer system resources supporting a set of logically related data elements so that that computer system configuration can be replicated. It may be desirable to replicate an existing computer system configuration for any of numerous reasons. For example, in order to minimize the extent to which modifications are needed for application programs which access a logical object on a first storage system, it may be desirable to move a logical object from the first storage system to a second storage system which supports the data set in a substantially similar fashion.

Automatic source identification can be performed in any of numerous ways, as the present invention is not limited to any particular implementation technique. Some computer system configurations include a management resource that can be queried to gather information about the configuration of the computer system. An example of such a management tool is the Control Center/Open Edition suite of software products available from EMC Corporation (hereinafter the ECC management tool). The ECC management tool allows a user to view the configuration specifics of a computer system. The ECC management tool employs a number of agents distributed throughout the computer system (e.g., on the hosts, the storage systems, and the network components) which use application programming interfaces (APIs) to communicate with a central management agent that collects the information and compiles it in a data set (e.g., a database) that provides a description of the infrastructure of the computer system. In one embodiment of the present invention, automatic source identification can be performed by querying the ECC management tool (e.g., its database) to ascertain the desired information about the configuration of an existing computer system managed by the ECC management tool.

It should be appreciated that the performance of automatic source identification is not limited to use with the ECC management tool, as numerous other techniques can be employed. For example, if a computer system has another type of management system associated with it that includes a data set containing the desired information relating to the infrastructure of the computer system, the information can be gathered from that management tool. Alternatively, if no centralized management tool exists that collects the relevant information relating to a computer system, a number of different tools can be employed to gather configuration information separately from the various components in the computer system. Furthermore, tools such as those available through the WideSky Storage Management Facility (including the SymmAPI-Mapper), available from EMC Corporation, allow for the identification of configuration information within a host, such as which logical volumes are assigned as storage resources for various components (e.g., a file system, LVM or database) on the host. In short, any of a number of tools may be used to collect the desired information from the components of the computer system to perform automatic source identification, as the present invention is not limited to any particular implementation technique.

In one embodiment, the output of the automatic source identification process is a definition of one or more resources on a computer system, and the configuration necessary to prepare those resources to perform the storage of, and support the access to, a data set. After automatic source identification, it may be desirable in some circumstances for a system administrator to modify this definition prior to employing it as a provisioning request with an automated provisioning process, which is described in further detail below. Modifications to the definition can be of any type, as there may be numerous circumstances where it may be desirable to model a new computer system configuration based upon an existing one, but with modifications of various types. In instances where a data set is migrated from one storage system to another, modifications may include changes to unique identifiers of the storage systems (or single storage system) on which the logical volumes that stored the data set are stored, expansion of the storage capacity allotted to the data set, assignment of a different RAID level for fault tolerance and disaster recovery, and/or other modifications. After modification, the definition may be submitted as a provisioning request to the automatic target provisioning process discussed below.

II. AUTOMATIC TARGET PROVISIONING

After a provisioning request has been created (automatically, manually or through a combination thereof, as described above), in one embodiment, the provisioning request serves as an input to a process which automatically provisions a computer system to satisfy the request. In one embodiment, the automatic target provisioning process includes three primary acts: resource selection, transaction creation and transaction execution. Resource selection involves identifying and selecting resources (such as storage systems, connectivity components and host computer resources) to fulfill the provisioning request. Transaction creation involves creating a program or log of commands that, when executed, perform the configuration acts that will configure the computer system as defined in the provisioning request. Transaction execution involves actually executing the acts to configure the computer system. Each of these portions of the automatic provisioning process is discussed in greater detail below.

A. Resource Selection

Figure 4:
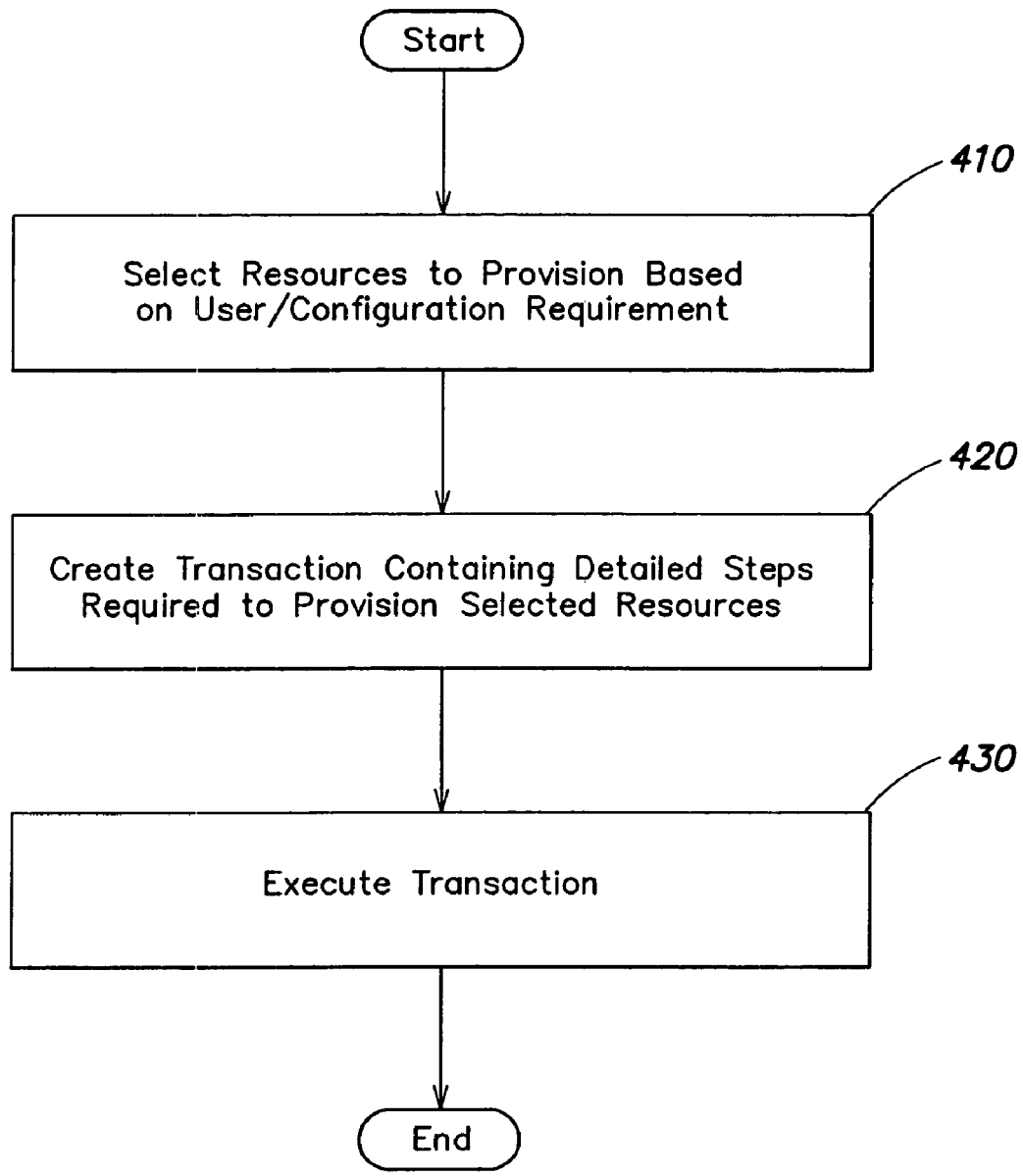
FIG. 4 is a flow diagram of a process used to provision a set of target resources for a migration in accordance with one embodiment of the invention.

Referring to FIG. 4, in act 410, resource selection is performed. Resources may include, for example, one or more host computers, storage systems, networking components and logical volumes. The resources are selected to fulfill the specifications set forth in the provisioning request.

The identification of the resources available to meet the provisioning request can be performed in any of numerous ways, as the present invention is not limited to any particular implementation technique. In accordance with one embodiment of the present invention for use in a system that includes a management system such as the ECC management tool discussed above, the management tool (e.g., its database) can be queried to discover the resources available for selection to meet the provisioning request. In accordance with the embodiment of the present invention wherein the automated provisioning process is implemented within the ECC management tool, the resource selection process can be performed, for example, by issuing queries to the database to retrieve the desired information.

For the embodiment of the present invention wherein a database is provided that stores information relating to the available resources, the capabilities of the database (e.g., the execution of SQL queries and use of database views) may be employed to optimize and expedite the resource selection process. For example, the database may store information concerning all physical elements (e.g., disks, connectivity equipment) and logical elements (e.g., LUNs) in the computer system. One or more database "views" can be implemented to pre-select portions of the database (defined by the view) against which queries can be executed, to make the execution of queries simpler and more efficient. For example, a database view might be employed to pre-select elements which have previously established physical communication connections, so that a query selects from only that subset. A database view might alternatively, or additionally, be employed to pre-select storage elements possessing other characteristics (e.g., zoned storage elements, or elements belonging to a storage pool).

It should be appreciated that the resource selection aspect of the invention is not limited to the use of database views or dynamically generated SQL queries which are executed against a relational database, as any suitable technique for gathering the desired information can be employed. For example, automated resource selection may be accomplished using any of a number of programmatic techniques (e.g., by translating selection criteria into a series of parameters to serve as input to one or more computer programs that execute against one or more data sets, or any of a myriad of other automated techniques). Manual techniques may also be employed, as well as combinations of automated and manual techniques.

In computer systems wherein a central management tool with an existing database of the resources included in the computer system is not available to be queried, other techniques can be employed to discover the resources available to meet the provisioning request. For example, if a management tool exists that provides a centralized API that can be queried to discover the resources in the computer system (e.g., the host computers, the network components and the storage systems), such a centralized API can be used to perform the resource discovery and selection process. If no such centralized management tool is available, most computer system components have their own APIs available that can be queried to gather information concerning the component, such as what type of component it is, the number of ports available, etc.

Figure 5:
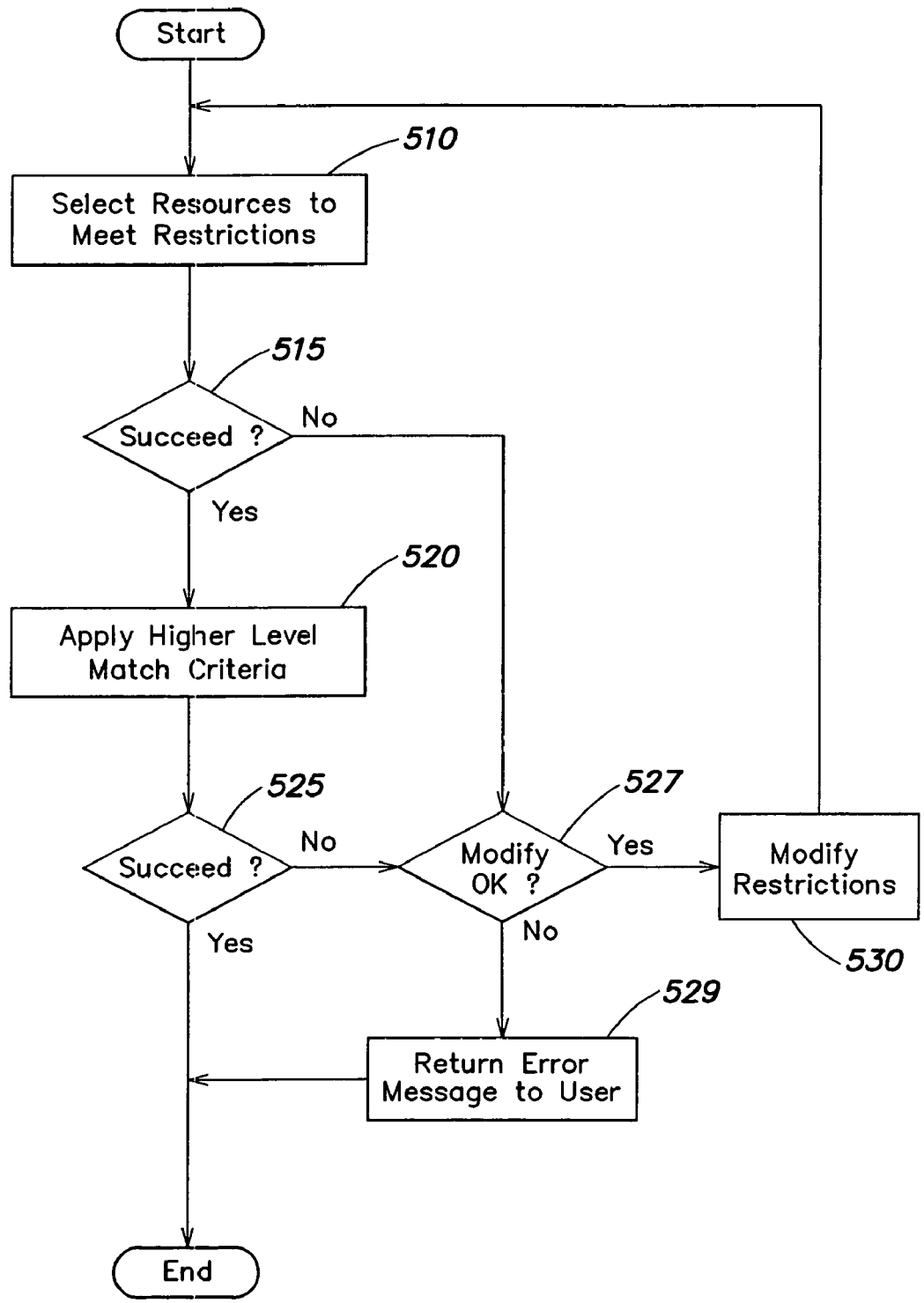
FIG. 5 is a flow diagram of a process used to perform target resource selection for a migration in accordance with one embodiment of the invention.

According to the embodiment depicted in FIG. 5, the resource selection process is executed in three basic acts 510, 520, 530, which can also be considered as hierarchical layers, with act 510 at the lowest layer and act 530 at the highest.

In act 510, storage elements are selected to satisfy the low-level criteria specified in the storage element descriptor, such as numbers of storage elements (e.g., logical volumes), the size of the storage elements, any particular requirements for physical storage devices for the storage elements, etc. As will be discussed below, some higher level requirements relating to a logical interaction of multiple storage elements is performed in the middle layer of the hierarchy at act 520.

As mentioned above, the act 510 attempts to select resources to satisfy the criteria presented to it. In accordance with one embodiment of the present invention, during an initial pass of the resource selection process of FIG. 5, the criteria provided to the act 510 incorporate the strictest constraints specified in the storage element descriptor. For example, if a provisioning request indicates some tolerance for re-zoning devices, in one embodiment of the present invention, during a first pass of the resource selection process of FIG. 5, the act 510 attempts to select resources to meet all of the criteria, including using zoned devices. In accordance with one embodiment of the present invention, the act 510 seeks to locate all of the resources that satisfy the storage element descriptor, and creates partitions with the storage resources, with each partition including storage elements that are essentially identical for the relevant characteristics specified in the storage element descriptor. Thus, each of the storage resources within a particular partition can be considered to be interchangeable in terms of satisfying the storage element descriptor, as they share the relevant common characteristics. By selecting all of the available resources that can potentially be used to satisfy the storage element descriptor, the likelihood of the middle layer of the hierarchy at act 520 finding compatible resources to satisfy the higher level criteria is maximized. Although advantageous, it should be appreciated that the present invention is not limited in this respect, and that rather than identifying all of the storage resources that may be used to satisfy the storage element descriptor in act 510, a subset can be identified (e.g., only the minimum number can be identified), and then additional iterations can be performed in a manner similar to that discussed below.

After completion of the act 510, the process proceeds to act 515, wherein a determination is made as to whether resources have been selected that satisfy all of the low-level requirements specified in the storage element descriptor. When all of the requirements have been met, the process proceeds to act 520, wherein the higher-level requirements relating to a logical association of multiple storage elements are considered in a manner discussed below. Alternatively, when it is determined at act 515 that sufficient resources could not be selected to satisfy the low-level requirements for the storage element descriptor, the process proceeds to act 527, wherein a determination is made as to whether the criteria for the storage element descriptor can be modified or relaxed. If not, the process proceeds to act 529, wherein an error message is returned indicating that the provisioning request cannot be satisfied as specified. At that point, a system administrator can evaluate whether to modify the provisioning request (e.g., by relaxing tolerances, reducing the amount of storage requested, relaxing performance characteristics, etc.).

When it is determined at act 527 that modification of the request is possible, which may occur if tolerances are specified that provide some room for flexibility, the process proceeds to act 530, wherein the criteria for the storage element descriptor are modified, and then the modified criteria are resubmitted to the act 510 to determine whether sufficient resources can be provided to meet the modified criteria. An example of the manner in which the criteria for the storage element descriptor can be modified relates to tolerances. As discussed above, in accordance with one embodiment of the present invention, during the first pass through the resource selection process, the strictest constraints are applied, so that, if at all possible, the system can be configured to meet the preferences specified in the provisioning request However, if the provisioning request indicates a preference for a certain characteristic, but a tolerance for having it not met, then the act 530, which implements the top layer in the hierarchy as discussed above, can relax one or more of the constraints within the bounds of the tolerances specified in the provisioning request, and resubmit the request to the lower layers on the hierarchy to determine whether a system can be configured that satisfies the relaxed constraints. In this respect, it should be appreciated that by relaxing certain constraints prior to resubmitting the criteria to the act 510, there is a possibility that a greater number of storage resources can be found that will meet the newly relaxed criteria.

It should be appreciated that the present invention is not limited in any manner to the way in which the top layer in the hierarchy (implemented by act 530) may relax constraints, as numerous implementations are possible. For example, the act 530 can begin by initially relaxing constraints for which the storage provisioning request indicates the highest tolerance for such relaxation.

As mentioned above, when it is determined at act 515 that sufficient resources have been identified to satisfy the low-level requirements for the storage elements at act 510, the process proceeds to act 520, which implements the second layer in the hierarchy to determine whether certain criteria relating to the logical relationship between two or more storage elements can be met using the resources selected in the act 510. There are numerous types of constraints that can be specified in a storage element descriptor and considered in the act 520. Examples include mirroring relationships such as a local or remote mirror. For example, for a snapshot mirror it is desirable to have two storage resources of the same size and type stored on the same physical storage system, and for a remote mirror it is desirable to have two storage volumes of the same size located on different storage systems. This is merely one example of the interrelationship between two or more storage elements that can be considered by the act 520, as there are numerous other possibilities.

It should be appreciated that in accordance with one embodiment of the present invention, if appropriate capabilities are provided by the hardware in the computer system, certain functions that might otherwise be considered to be high level can be implemented at the lower-level act 510. For example, if the computer system includes intelligent storage systems that have the capability of providing hardware mirrored devices, the request for a mirrored configuration in the storage element descriptor can, in one embodiment of the present invention, be met at the lowest-level act 510. Thus, the partitions created thereby can include mirrored sets of devices, such that this logical relationship need not be addressed at the higher level act 520. Of course, it should be appreciated that the present invention is not limited in this respect, and that mirroring relationships can, alternatively, be addressed at the higher level act 520.

Furthermore, it should be appreciated that the mirroring function is merely one example of the capability that may be provided by the hardware in the computer system and can be implemented at the lower-level act 510.

In one embodiment, the act 520 seeks to satisfy the storage element descriptor by identifying specific storage resources from among the partitions provided by the act 510. After the higher level criteria has been evaluated at act 520, the process proceeds to act 525, wherein a determination is made as to whether the higher level criteria specified in the storage element descriptor have been met. If so, specific storage resources that can be used to implement the desired computer system will have been identified in the act 520, and the process will terminate.

Alternatively, when it is determined at act 525 that the resources selected at act 510 are not sufficient to enable the higher level criteria to be met, the process proceeds to act 527, wherein a determination is made as to whether the selection criteria can be relaxed, in the manner discussed above.

It should be appreciated from the foregoing that the process illustrated in FIG. 5 can be an iterative one, wherein attempts are first made to satisfy the storage element descriptor with the tightest possible constraints, and wherein these constraints can be relaxed, under control of the highest level in the hierarchy (implemented at the act 530), through one or more additional iterations of the process, until the storage element descriptor has been satisfied, or until a determination is made that sufficient resources are not available to satisfy the storage element descriptor.

The invention is not limited to performing the above-described acts in the sequence described, or in any sequence at all. Some embodiments may accomplish resource selection using a process comprising a different number of acts than that described, and comprising acts which may be performed serially, in parallel, or a combination of the two.

In short, any suitable technique that enables the identification of resources within a computer system, and that provides information desirable for determining which resources will comply with the provisioning request, may be used to perform resource selection, as the present invention is not limited to any particular implementation technique.

Although all of the steps of the provisioning process are automated in one embodiment of the present invention, it should be appreciated that the present invention is not limited in this respect, and that some of these acts (including the resource selection act) can include manual activity, or can be performed entirely manually.

B. Transaction Creation

In act 420 (FIG. 4), a transaction is created that sets forth a series of actions to be performed to configure the computer system in a manner that meets the definition provided in the provisioning request. The types of actions in the transaction may include any of the types discussed above, such as mapping logical volumes to various ports from which they are to be visible, providing security measures to restrict access as specified in the provisioning request, commanding host computers to scan their ports to recognize logical volumes made available to the host computers over those ports, allocating one or more logical volumes to a file system, LVM, database or other host computer resource, configuring the logical volume type (e.g., a standard storage volume, a mirror, a hot spare, etc.), creating any desired mirroring configurations, etc. The transaction includes a number of actions, including low level actions that are performed to physically configure the computer system to meet the provisioning request.

It should be appreciated that the precise nature of the actions to be built into the transaction will vary depending upon the specific nature of the components in the computer system. For example, host computers may have different types of operating systems that support different configuration actions, and different types of storage systems and networking components may similarly support different types of configuration actions.

In accordance with one embodiment of the present invention, the transaction is assembled not simply in a brute force manner to achieve the end result of configuring the computer system in a manner that satisfies the provisioning request, but other considerations are taken into account, including efficiency of the configuration process when the transaction is executed. For example, time is incurred when a host computer scans its I/O ports to identify new logical volumes that have been made available over those ports. Thus, in configuring a computer system, it is desirable to minimize the number of times that a host computer will perform such a scan, so rather than making logical volumes available to a host and scanning them one at a time, it may be desirable, for example, to perform actions that make a plurality of logical volumes being assigned to a host computer available, and to then perform a single scan operation that identifies all of these logical volumes. It should be appreciated that this is provided merely as an example, as other situations may exist where effectively planning the sequence of operations in a transaction can lead to efficiencies in the execution of the transaction.

Although desirable, it should be appreciated that the present invention is not limited to organizing the transaction to achieve efficiency in its execution, as the transaction can be created and executed in any way that is effective in configuring the computer system to meet the provisioning request.

In one embodiment, during creation of the transaction, intelligence is provided to identify whether certain configuration steps are necessary. For example, if a logical volume has already been mapped to a particular port, an operation need not be included in the transaction to perform such mapping.

Furthermore, in accordance with one embodiment of the present invention, when the transaction is created, safety checks are performed to ensure that resources are not inconsistently assigned. For example, a check can be performed to ensure that a logical volume is not inconsistently allocated to multiple resources, which could result in a loss of data.

In accordance with one embodiment of the present invention, a capability is provided to undo one or more of the operations performed by the transaction in physically configuring a computer system to meet the requirements of the provisioning request. In this respect, it should be appreciated that the provisioning of a computer system may be an iterative process, wherein an administrator initially may decide to perform a certain configuration operation, but thereafter detect an unintended result and wish to undo the operation. Thus, in accordance with one embodiment of the present invention, the entire provisioning transaction can be undone. In accordance with another embodiment of the present invention, a subset of the operations performed during the transaction (including in one embodiment down to the level of each operation) can be undone. In this manner, after the transaction is executed, or during its execution, the transaction can be rolled back to any desired place in the transaction.

It should be appreciated that the embodiment of the present invention that provides the ability to undo the transaction is optional, as all embodiments of the present invention are not limited to providing this capability. Furthermore, it should be appreciated that the ability to undo or rollback a transaction can be implemented in any of numerous ways, as the present invention is not limited to any particular implementation technique.

In accordance with one embodiment of the present invention, the undo and/or rollback feature can be implemented by creating a rollback routine at the same time the transaction is created. Thus, during creation of the transaction, for each operation created, a parallel operation is created to undo it. In this manner, the entire transaction can be undone by executing the entire parallel undo transaction, or the transaction can be rolled back to any particular operation by executing only the corresponding undo operations in the parallel undo transaction.

It should be appreciated that the nature of the operations created during the transaction creation process will vary depending upon the physical components in the computer system. As discussed above in connection with the resource selection process, central management tools and/or separate interfaces for each of the system components can be employed to discover these resources. Similarly, in some computer systems, a central management tool may be provided that enables an administrator to configure the entire system by dealing only with the central management tool. When the system to be provisioned includes such a central management tool, the operations created during the transaction creation process can be directed to that central management tool and conform to the communication protocol used thereby. Alternatively, the separate APIs provided by each of the system components can be used for performance of the desired operations created during the transaction creation process.

It should be appreciated that the transaction creation process is not limited to performing operations of any particular type, as any suitable operation that, when executed, performs the desired configuration actions can be employed.

Similarly, the transaction and the operations included therein can take any of numerous forms, and can be written in any computer-readable language or format.

In the embodiments discussed above, a single transaction is created to perform all of the provisioning desired for an entire computer system. It should be appreciated that the present invention is not limited in this respect, and that multiple separate transactions can alternatively be created and executed to provision portions of the desired computer system.

C. Transaction Execution

After the transaction is created in act 420, the automated provisioning process proceeds to act 430, wherein the transaction is executed. As discussed above, in one embodiment of the present invention, the transaction includes a series of operations in computer-readable form, such that the execution thereof can comprise a computer executing the software code that performs the desired operations. In one embodiment of the present invention, all of the operations recited in the transaction can be executed by a server or host computer in the computer system which implements management control functions for the computer system (e.g., a server executing the ECC management tool discussed above). However, it should be appreciated that the present invention is not limited in this respect, and that the transaction can alternatively be executed on any suitable component within the computer system, including host computers, a storage system, a network component, etc., as any component of the computer system that includes a processor may be capable of executing the transaction. Furthermore, it should be appreciated that the present invention is not limited to having all of the operations in the transaction executed by a single system component, as the transaction can alternatively be split among multiple different components within the computer system that can each execute some of the operations of the transaction.

As discussed above, while it is advantageous to create (in act 420) and execute (in act 430) a transaction that performs all of the provisioning operations desired for a computer system, the present invention is not limited in this respect, as a transaction can be created and executed that can alternatively automatically perform only a subset of the provisioning operations for a particular computer system.

In accordance with one embodiment of the present invention, the act 430 of executing the transaction is performed automatically in response to completion of the act 420 of creating the transaction, which in turn is performed automatically in response to completion of the act 410 of resource selection. This is advantageous, in that the entire provisioning process is automated. However, it should be appreciated that all embodiments of the present invention are not limited in this respect, and that manual intervention can be performed between the resource selection act 410 and the transaction creation act 420, and/or between the transaction creation act 420 and the transaction execution act 430. For example, a system administrator may desire to examine, and potentially modify, the transaction created in act 420, prior to execution in act 430. Furthermore, in one embodiment of the invention, one or more manual operations may be placed within a transaction which is otherwise executed automatically in act 430. In this embodiment, a portion of the transaction may be automatically executed before one or more manual operations is reached, and automatic execution may be paused or suspended until a user performs the manual operation(s). Upon receiving confirmation that the manual operation(s) are complete, automatic execution of transaction steps may be resumed. An example of a circumstance where it may be desirable to insert one or more manual steps is when actions by an administrator are desired before a transaction can complete. For example, when automatically provisioning a file system extension, it may be desirable to shut down or restart an application to recognize the newly extended file system.

III. AUTOMATICALLY MOVING THE LOGICAL OBJECT FROM THE SOURCE TO THE TARGET

Numerous techniques may be employed for moving the data from the source to the target storage locations, once they have been identified. For example, some computer systems will include resources that can be employed to facilitate movement (e.g., copying) of data. Such facilities include those that may be provided within a logical volume manager (e.g., resident on the host computer 223 in the example of FIG. 2) that has the ability to create a software mirror for a volume and synchronize it to result in a copying of the data from one location to another. Another example of a facility that may be available in some computer systems is a direct link between the storage systems on which the source and target locations are resident, such that the storage systems themselves can copy the data. An example of such a system is the SYMMETRIX remote data facility (SRDF), available from EMC Corporation, Hopkinton, Mass. and described, for example, in U.S. Pat. No. 5,544,347.

Another technique for migrating data employs, in one embodiment, a data mobility agent as described in commonly assigned co-pending U.S. patent application Ser. No. 10/315,791, entitled "Method and Apparatus for Migrating Data in A Computer System", filed Dec. 10, 2002, which is incorporated herein by reference. Portions of that application will now be reiterated herein.

In accordance with one embodiment, data movement is performed wherein the data set being migrated (e.g., copied or moved) need not be taken offline during the migration. Such a migration can occur "in the background" while normal application processing proceeds. An example of a technique for performing an on-line migration is described in commonly assigned co-pending application Ser. No. 10/122,556, entitled "Method and Apparatus for Managing Access to Volumes of Storage," which is incorporated herein by reference. In one embodiment described therein, after the migration is complete, I/O requests are automatically "redirected" from the source locations of the migration to the target locations, so that they access data in its new location. This can be done transparently to the applications that access the data, so those applications need not be taken offline. This technique is mentioned herein only as an example, as the aspects of the present invention applicable to on-line migrations can be employed with any on-line migration technique.

In accordance with another embodiment, a tool is provided to more effectively control migration processes. As noted above, data migrations can often be costly and error-prone exercises. One reason for this is that migrations can be "black box" processes, whose results can only be verified after completion, and which, after initiation, can only either proceed to completion or be aborted. There is typically no opportunity to control a migration while it is in progress. Accordingly, one embodiment of the invention provides the ability to control a data migration in progress.

In one embodiment, the ability is provided to pause and restart a migration. This can be advantageous for several reasons. First, if overall system performance suffers because a migration occupies an inordinate amount of processing resources, the migration can be paused and restarted at a more opportune time (e.g., during off-hours). Second, an administrator might pause a migration, adjust one or more parameters defining its execution, and restart it. Thus, if the migration is proceeding in an undesired manner, it can be adjusted midstream.

In accordance with one embodiment of the invention, the ability is provided to regulate the impact the migration has on overall performance of the computer system. This regulation may be accomplished in numerous ways. In one example, because a data set being migrated may comprise multiple data segments dispersed across multiple storage resources (e.g., physical devices and/or storage volumes, as discussed below), a migration may comprise movement of data between multiple discrete source/target pairs, and the regulation of the migration's impact on system performance may be accomplished by providing a maximum number of simultaneously active source/target pair transfers. In this embodiment, each source/target pair may be initially processed all at once, but once the maximum number of transfers has been reached, the remaining pairs may be queued so that the transfer of data does not begin for the queued pairs until one or more of the previous transfers are complete. Other embodiments may provide the ability to regulate the migration's impact on system performance by limiting the total amount of data being transferred at once, the amount of data transferred at once by an individual transfer vehicle (e.g., a particular host), or using other measures. In one embodiment, regulation parameters may be adjusted while the migration is in progress to speed it up or slow it down as circumstances dictate. For example, a user may increase the total amount of data that can be transferred at once to accelerate a migration during business off-hours.

In another embodiment, the resources assigned to a migration can be controlled by assigning a processing "priority" to the migration. The priority may define how processing resources on the host are assigned to the migration in relation to other processes. In this manner, a migration can be expedited by assigning it a higher priority, or if the migration is not a high priority it can be processed in a manner that minimizes the impact on system resources. In one embodiment, the priority may be adjusted while a migration is in progress.

In certain computer system configurations, numerous migration methods (i.e., transfer vehicles) may exist for transferring data between one or more source/target pairs. These include, but are not limited to, host-based procedures, storage system-based procedures (e.g., hardware mirroring facilities), and networking component-based procedures. Applicants have appreciated that it may be desirable to employ different migration methods for different source/target pairs in a single migration session. Thus, unlike conventional migrations which are limited to one migration method to move the entire data set, one embodiment of the invention provides the ability to choose different migration methods for source/target pairs in a same data set. The migration method for each source/target pair can be specified by a user, or, in one embodiment, the system can automatically pick a migration method for one or more source/target pairs. The choice of a migration method (by a user or automated process) can be made based on any of numerous factors. For example, the selection may seek to minimize the impact on system performance, by utilizing certain data transfer utilities when possible (e.g., a storage-to-storage hardware mirror facility, or an LVM replication capability).

In one embodiment, the migration of a data set, which can be any collection of data whether logically related (e.g., a file, database, file system or other collection of data) or not, is managed by creating a migration "session," through which the migration of data for each source/target pair is facilitated. Each source and target may comprise any of numerous types of storage resources, such as a LUN, a "disk" presented by a storage system, a physical storage device, a logical volume presented by a logical volume manager (LVM) or some other storage resource. The correspondence between sources and targets need not be one-to-one, as data on a source volume may be transferred to multiple targets, and the data from multiple sources may be transferred to a single target.

In one embodiment, the ability is provided to initiate a migration upon the occurrence of a predefined event. A predefined event may comprise a predetermined time interval, start time, or other event. In addition, a migration may involve the movement of data from one location to another, or the copying of data to another location. For example, a migration may be initiated to produce one or more copies of a data set at predefined intervals, so that "point-in-time" snapshots of the data set are created. Such snapshots may be useful for error recovery, to enable more efficient distributed access to the data set, or to satisfy other needs.

In one embodiment, a migration is controlled by a data mobility agent. The data mobility agent may be software-based, and may execute on a host computer or on any other device in a computer system. However, the invention is not limited in this respect, as the agent may comprise any suitably adapted hardware and/or software-based component(s). In one embodiment, an agent employs one or more application programming interfaces (APIs) which allow it to communicate with, and control the functions of, various external utilities as discussed below. For example, APIs may allow an agent to invoke a host-based copy procedure or any other transfer method supported by the computer system on which the migration occurs. APIs may also be provided which allow external entities to control the agent's functions. For example, in one embodiment, the agent's functions are coordinated by a management tool, such as the Control Center/Open Edition suite offered by EMC Corporation (hereinafter the ECC management tool), which may perform complementary functions to those described herein, including determining the various locations at which a given body of data resides, provisioning devices to store the data and configuring network equipment to enable secure data transmission. However, the present invention is not limited in this respect, as the agent can control, and be controlled by, other processes in numerous other ways.

In one embodiment, the agent communicates with other resources on the computer system to control the transfer of data and perform related functions. For example, an agent may directly invoke the functions of a migration method (e.g., a host-based copy routine, a storage system-to-storage system routine, and/or others) on the system.

In one embodiment, instructions are presented to the agent in a data structure which provides operational parameters for the migration session and each source/target pair. The characteristics and function of an illustrative data structure are discussed in detail below.

In one embodiment, the agent utilizes a data repository to store and retrieve data related to the migration session. The repository may provide data useful for ascertaining the state of various entities involved in a migration, for recovering from system malfunctions, and other purposes. The repository may be a database, file, or other data set (i.e., a collection of data), and need not be centralized in a single store. In one embodiment, the repository may only be accessed and/or updated by one or more agents, but the invention is not limited in this regard, as other embodiments may provide for repository access and/or update by other processes executing on the system.

A. The Data Structure

As discussed above, in one embodiment the agent's operation, and thus the migration, is controlled in part by parameters specified in a data structure submitted to the agent to define the migration. The data structure may be created based on a user's input to any suitably adapted input facility (e.g., a GUI, command line interface, or other input tool). While a data structure serves as one of the primary modes of communication between user and agent, the invention is not limited in this respect as other communication/input tools may be employed.

In one embodiment, a separate data structure defines the parameters for each migration session. Of course, the invention is not limited in this respect, as a single data structure could provide parameters for multiple migration sessions.

In one embodiment, the data structure provides not only parameters for an overall migration session, but also separate parameters for individual source/target pairs. As discussed above, a migration session may comprise the movement of data between a number of discrete source/target pairs. Thus, providing separate parameters for each source/target pair allows an administrator to specify different migration methods for each source/target pair, ascertain the individual status of each source/target pair, and otherwise separately control and monitor individual source/target pairs. However, the invention is not limited in this regard, as separate parameters need not be provided for all individual source/target pairs. Furthermore, a migration session may comprise a single source/target pair.

The data structure may take any desirable form (e.g., relational structure, hierarchical structure, flat file, object-oriented or other form).

Figure 7:
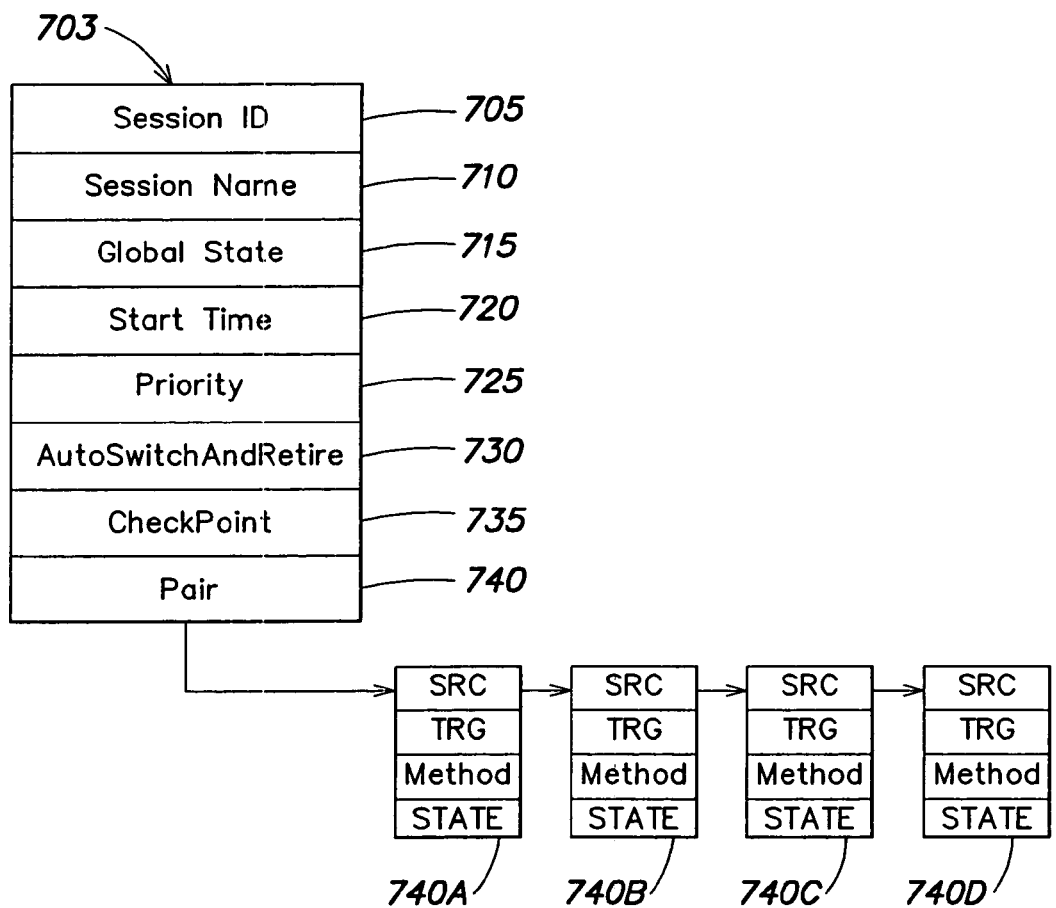
FIG. 7 depicts a data structure employed by one embodiment of the invention to supply migration session parameters and state information.

An illustrative form for the data structure is depicted in FIG. 7. As discussed in more detail below, this data structure serves the dual purpose of providing input to the agent to control aspects of a migration session, and also allows the agent to provide status regarding a previously initiated migration session. In this respect, in one embodiment, when the agent receives the data structure, it loads the migration parameters provided therein into the data repository. When the agent is queried to determine the status of an ongoing migration session, in one embodiment the agent recreates the data structure based on the most current data in the repository, and returns the updated data structure (e.g., to the user interface). It should be appreciated, however, that the invention is not limited to employing the same data structure as an input to and output from the agent, as different structures may be used for these purposes. Also, the particular fields and format of the data structure shown in FIG. 7 are merely illustrative, as the invention is not limited in this respect.

Referring to FIG. 7, the data structure 703 includes a session ID 705, which is an identifier for the migration session. The session ID may be an alphanumeric string, although it is not limited to any particular format. The identifier performs several functions. First, it creates a logical entity to which a number of underlying source/target pairs can be related. Second, it allows each migration session to be tracked independently, even after completion. Third, it attaches a unique identity to each migration session, so that if multiple migration sessions proceed simultaneously, each can be uniquely identified and coordinated separately. The identifier may be assigned by any entity in the computer system that can ensure the creation and assignment of unique identifiers for each migration session. For example, where the computer system includes a management tool (such as the above-discussed ECC management tool), the identifiers may be assigned by that management tool. Alternatively, in a system which includes multiple agents, one agent may be assigned to function as a "master" to assign session identifiers for the system, or any other entity may be chosen to perform this function.

The data structure 703 also includes a session name 710 that is a descriptor for the migration session. The descriptor may be an alphanumeric string supplied by a user to associate a more descriptive user-recognizable name to the session than that provided by the session ID. For example, if a particular database is to be migrated, an administrator may use the name of that database as the session name 710. The session name eliminates the need for a user to memorize a session identifier in order to recognize a particular session, and can provide a meaningful description that facilitates recognition of what the session entails. The session name 710 may also prove especially useful in providing an enduring record of past migration sessions.

The data structure 703 further includes a global state field 715 for the migration session's global state. This field 715 may not be populated when the data structure is submitted to initiate the session, but can be used when the agent presents the data structure to report on the status of the session. As discussed below, in the embodiment of FIG. 7, the agent ascertains the state (i.e., status) of each source/target pair migration. If queried about the status of the overall migration session, the agent may aggregate source/target pair status indications to determine a global state for the migration session. The aggregation and characterization of global state may be performed in any of a number of ways, as the invention is not limited in this respect. Examples of the migration status types that can be provided in the global status field 715 are discussed below.

The data structure 703 also stores an indication of the start time 720 of the migration session. In one embodiment, this reflects when the agent received the request to begin the migration. This indication may be useful in numerous ways. For example, the start time indication may allow the agent to calculate the duration of an ongoing migration session. This may be useful for limiting a migration session to a certain maximum elapsed time. Using this capability (e.g., in conjunction with the priority indicator discussed below), a user may prevent a migration session from occupying system resources over an extended period, keep a session from exceeding a predetermined time window (e.g., if a user wants a migration to process only during non-business hours), or otherwise control the timing of the migration. The start time indication may also be useful in resolving conflicts between migration sessions. For example, in one embodiment discussed below, an agent may begin a migration session by first determining whether any source/target pairs comprising the session are "locked" by another session. If two migration sessions simultaneously seek to access a particular device, the conflict may be resolved by determining which migration session started earliest. The start time indication may also be useful in that it may specify a later start time for the migration. For example, an administrator might use the start time indication to specify that the migration should begin during business off-hours. The examples above are provided for illustrative purposes only, as the uses of the start time indication are not limited to those listed.

The data structure 703 also has a priority field 725 which defines the relative priority assigned to the migration session. The priority field provides input to the agent as to the amount of processing resources to be allocated to the migration session. The priority/resource control can be implemented in any of numerous ways. For example, the agent may communicate directly with the host operating system to influence resource distribution. Alternatively, in one embodiment the agent uses the priority to determine the quantity of resources to take for itself by altering the resource-intensiveness of the migration process. For example, the priority may instruct the agent how long to wait between issuing transfer (e.g., copy) commands, how many memory buffers to employ, how large each buffer should be, a total duration for the migration session, or provide any other type of information that impacts resource usage. The priority may be set by a user, management tool, or other entity. In one embodiment, the priority may be modified while a migration session is in progress (e.g., by an administrator submitting an updated data structure to the agent with a modified entry in the priority field) so the user can "throttle" the migration as circumstances dictate.

The data structure 703 includes an auto-switch and retire field 730 that indicates whether the agent should perform an "auto-switch" and/or retirement at the completion of the migration session. This field is provided for use with a migration process that can automatically (i.e., without reconfiguring the host) redirect host accesses from the source to the target. An example of such a migration process is described in the above-referenced application Ser. No. 10/122,556. The embodiment of the invention that includes the auto-switch and retire field 730 is not limited to use with this particular migration process, and can be used with any migration process having this capability. Furthermore, the invention is not limited to use with migration processes having this capability, as the auto-switch and retire field is optional.

The timing of the switch to the target can be controlled by the auto-switch and retire field 730, with any of several options. For example, the field 730 can specify that the switch be performed at a predetermined time, upon a predetermined event (e.g., when the business day concludes), when the migration is completed, on an individual source/target pair basis as each pair is completed, or any other desired circumstance. The retire option relates to rendering the source location inaccessible after a switch is completed, for any number of reasons, examples of which are discussed in the above-referenced application Ser. No. 10/122,556. In one embodiment, the migration process may allow a migration to be "undone" if it was unsuccessful in some respect, so source retirement may not be desired in all circumstances. Accordingly, the auto-switch and retire field 730 may support specifying that automatic switching be performed, but that retirement not be performed.

The auto-switch indication may be initially set by a user, by a management tool, or other entity. In one embodiment, the auto-switch indication may be modified while a migration session is in progress. The auto-switch process is discussed in further detail below with reference to FIGS. 8A and 8B.

The data structure 703 further includes a checkpoint field 735 which indicates whether the agent should track the progress of the migration so that if the migration is interrupted by the failure of any component in the system, the migration can be restarted from the point of failure. This field is intended for use with a migration process that has the capability to log the state of a migration and restart it in the event of an interruption. One example of such a migration process is described in co-pending commonly assigned application Ser. No. 10/211,469, entitled "Migration Host-Based Mirroring," which is incorporated herein by reference. However, the present invention is not limited to use with this migration process, as other techniques may be employed to log the state of a migration and resume from a point of failure, and aspects of the present invention can be employed with migration techniques that do not have this capability. Use of the checkpoint field may be advantageous because it provides an administrator control over whether such logging is performed, thereby preventing the unnecessary consumption of system resources if such logging is not desired.

Finally, the data structure 703 includes one or more pair tables or fields 740A-D, each of which includes information on one of the source/target pairs in the migration session. In the embodiment shown in FIG. 7, four tables are shown and each identifies the corresponding source and target, the method to be used to move the data from the source to the target, and the state of the migration for the source/target pair. However, the invention is not limited to providing this information for any specific number of source/target pairs, as the number of tables or fields may range from one to any suitable number. Further, the invention is not limited to providing the specific information shown, as different sets of information are possible.

As discussed above, the sources and targets involved in the migration may be any of various types of storage resources, examples of which include "disks" or LUNs provided by a storage system, actual physical storage devices, and logical volumes specified by a logical volume manager (LVM). The migration method suitable for a source/target pair may depend, in part, on the types of storage resources. For example, a hardware mirroring option for LUNs from one storage system to another may only be available when the computer system on which the source and target are provided supports such a facility, and a mirroring utility provided by an LVM may only be available as the migration method when the source and target are logical volumes managed by the LVM. In one embodiment discussed below, the data structure 703 can specify the migration method for each source/target pair (e.g., it can be selected by an administrator) or the data structure can instruct the agent to choose a migration method for one or more source/target pairs.

B. Agent Operation

In one embodiment, the agent performs a number of processes, including starting a migration session, pausing and restarting a migration session, canceling a migration session, facilitating auto-switching and retirement, and a wakeup process. This embodiment is merely illustrative, as the agent is not limited to performing these processes, and other implementations of the agent are possible. Similarly, although an illustrative implementation of each process is described below, the invention is not limited to these implementations, as each process can be implemented differently.

1. Starting A Migration Session

Figure 8A:
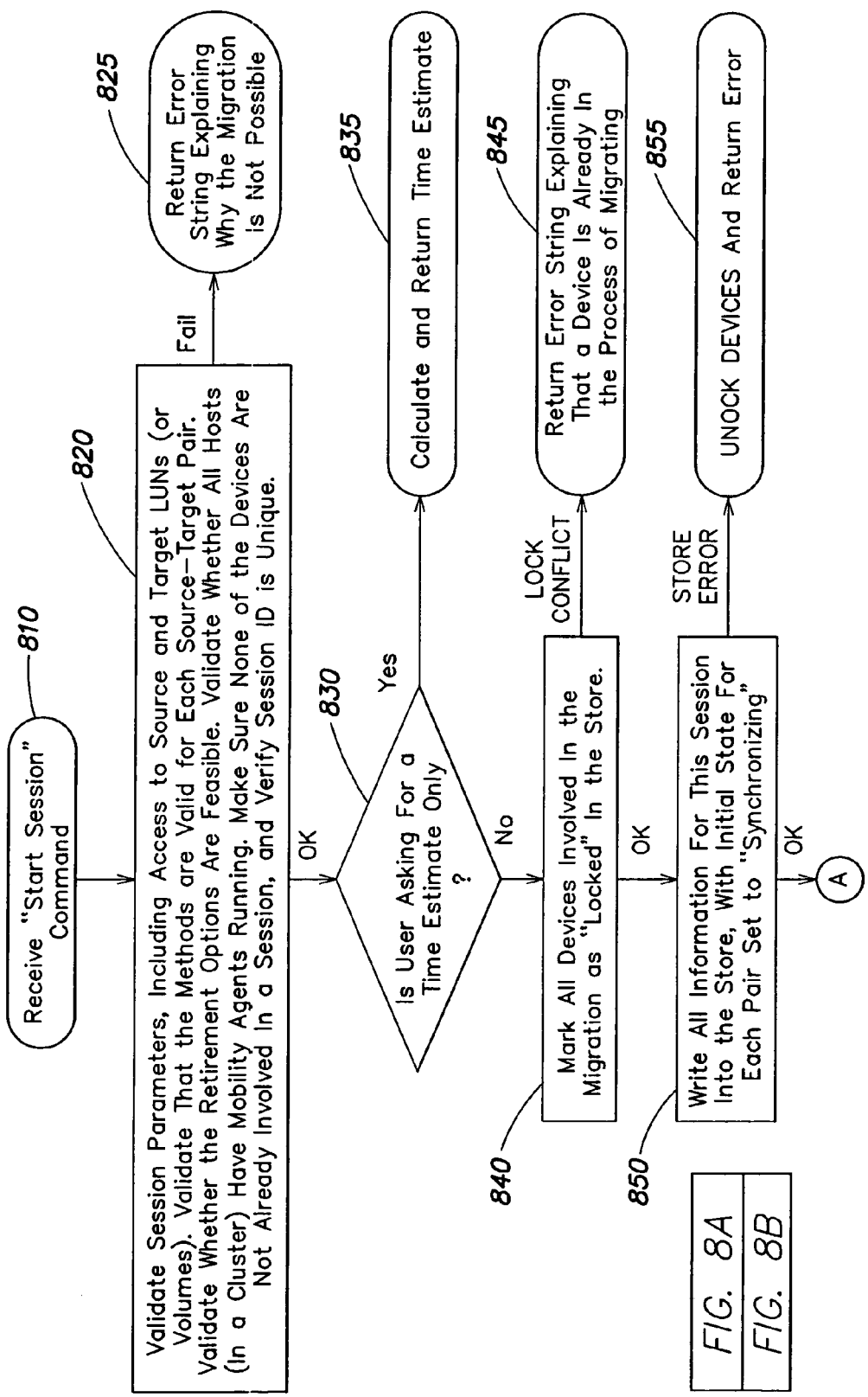
FIGS. 8A and 8B collectively represent a flow diagram of a process used to start a migration session in accordance with one embodiment of the invention.
Figure 8B:
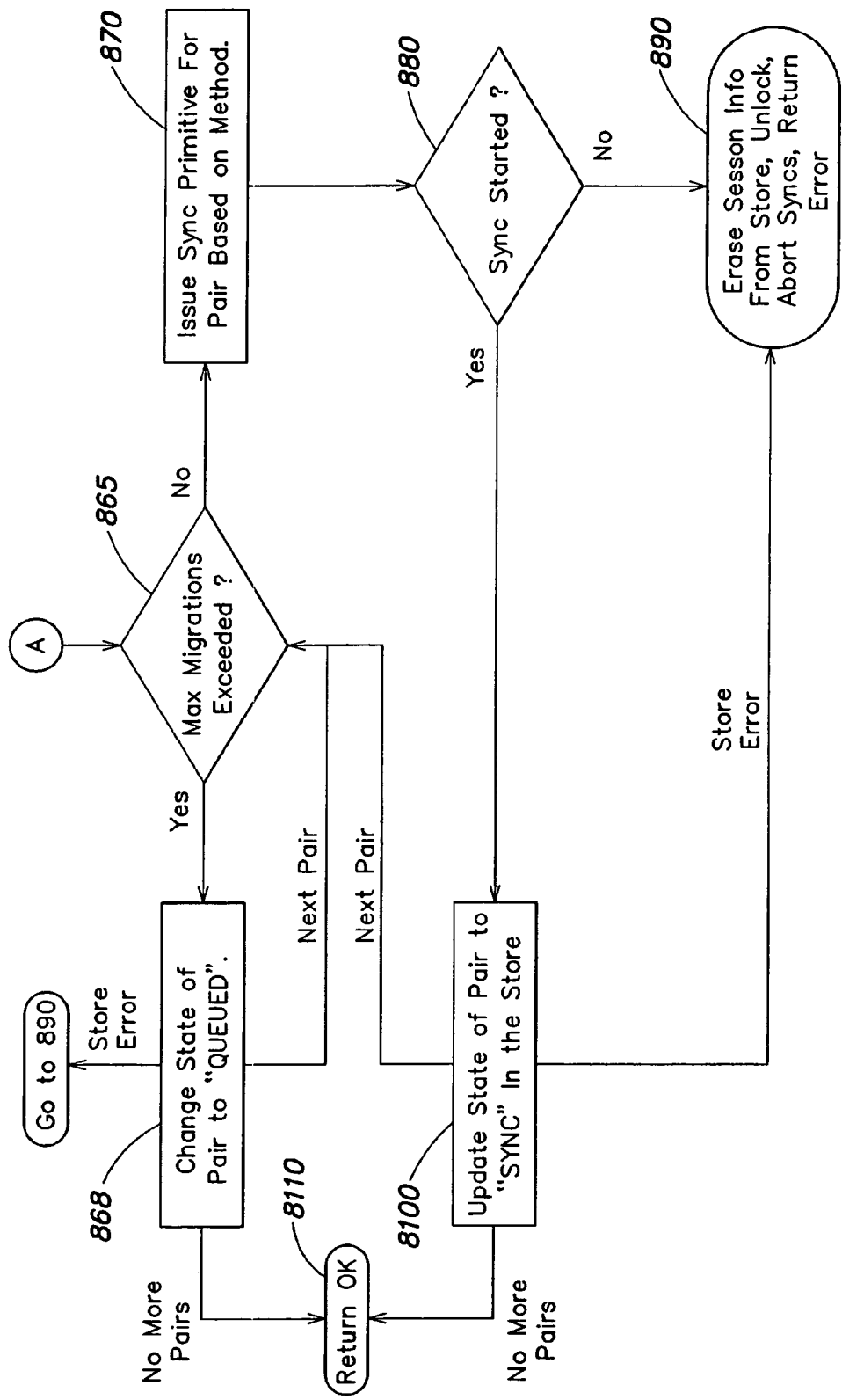

An illustrative process for initiating a migration session is depicted in FIGS. 8A and 8B. As discussed above, in one embodiment a migration session begins when the agent receives instructions for the migration session in the form of a data structure. The data structure is provided to the agent when a "start session" command is received in act 810. The start session command can be received from a user, a management tool (e.g., the ECC management tool) or other entity.

In act 820, the process validates the parameters provided for the migration session. The invention is not limited to validating any specific parameters. The specific parameter validation acts described below provide one example of verification that can be performed with the data structure of FIG. 7.

In act 820, the process validates that it can communicate with and access all named source and target volumes. This can be done in any suitable way, as the invention is not limited to a particular technique. The process also validates the migration method specified for each source/target pair. This may be performed to ensure that the agent can invoke the migration method as specified for each named source/target pair. For example, in one embodiment, a user may select a migration method (e.g., from a standard list provided by a management tool) that may not be available for a particular source/target pair. For example, a storage system-to-storage system hardware mirror facility (e.g., a remote data facility such as EMC's Symmetrix Remote Data Facility, or "SRDF") may be specified as the migration method for a source/target pair, but the storage systems on which the source and target devices reside may not be equipped to execute such a facility (e.g., there may be no direct link between them).

In the embodiment of FIGS. 8A and 8B, the validation act 820 further checks the option specified in the auto-switch/retirement field 730 of FIG. 7. There are numerous ways in which a device can be retired (i.e., made unavailable for access), but various storage systems may support only a subset of such options. For example, in one embodiment, a user may specify that a source device be retied by making it "not ready" after the switch. If the source device resides on a storage system that doesn't support a "not ready" command, the validation will fail.

The validation act 820 further checks that none of the named source or target devices are currently involved in a migration session. This may be important for several reasons. For example, data on a target device could be overwritten and lost if information arrives from two different source devices. In another example, when a migration of data is intended to move data from one location to another, data on a source device should not be migrated to two different target devices. In one embodiment, this check comprises verifying that none of the sources or targets are "locked" by an ongoing migration session. The locking of devices will be discussed in further detail below. This check may be performed in a number of different ways, as the invention is not limited to any particular technique.

The validation act 820 further checks that the session ID 705 (FIG. 7) is unique. This can be done in any of numerous ways. In one embodiment, the process checks the data repository (where a listing of all session IDs is maintained) to ensure that the session identifier has not been used before.

In one embodiment, the validation act 820 also selects the migration method for any source/target pairs for which a migration method is not specifically identified. As discussed above, the data structure may specify the migration method for each source/target pair. In one embodiment, the data structure may alternatively instruct the process to pick a migration method for one or more pairs (e.g., based on the characteristics of the source and target resources). In one embodiment, the process queries each source and target device to determine the relevant characteristics thereof, and determines the most appropriate migration method based upon this information. For example, if a source/target pair includes LUNs on storage systems having a hardware mirroring facility between them, the process may choose that migration method for the pair, but if such a hardware mirroring facility is not available, the process may choose a host-based copy instead. In one embodiment, when the method is chosen for a source/target pair, the data structure is updated to reflect the method for the pair so that the chosen method(s) may be invoked in act 870 (described below).

In the embodiment of FIGS. 8A and 8B if any of these validation acts fails, the process returns an error message in act 825. The error message may take any of numerous formats. In one embodiment, the error message indicates that the migration can not be performed as requested, and optionally states why (i.e., it identifies failed parameters). In one embodiment, the process returns an error message to the user and/or records the error message in a system log.

It should be appreciated that by validating session parameters before initiating a migration session, the embodiment of FIGS. 8A and 8B minimizes the chance that a process will begin that cannot be completed as specified, thereby avoiding a waste of resources in beginning such a session. However, it should be appreciated that the invention is not limited in this respect, and that the validation process need not be performed before beginning a migration session.

When the validation act completes successfully, the process proceeds to act 830, wherein a determination is made as to whether the user is only requesting a time estimate for the session (e.g., as specified in the data structure). If so, the process proceeds to act 835 wherein an estimate is calculated and returned to the user, and the process terminates. A time estimate may be useful in helping a user schedule an appropriate time to perform a particular session. The time estimate can be calculated in any of numerous ways, as the invention is not limited to any particular technique. For example, in one embodiment the agent may calculate the estimate by analyzing the volume of data to be migrated, the migration methods specified for each source/target pair, the device types included, their access rates, the number of pairs comprising the session, and/or other information.

When it is determined in act 830 that a time estimate is not requested, the process proceeds to act 840, wherein the agent attempts to lock all source/target pairs which comprise the migration session, thereby preventing other migration sessions from accessing those devices. Devices can be locked in any of numerous ways. In one embodiment, data can be kept in the repository used by the agent to specify devices locked by a migration session. If the attempt in act 840 to lock one or more devices fails because another migration session has already locked it, the process proceeds to act 845 wherein an error message is returned explaining that the device(s) are currently unavailable for the migration session.

Once the source and target devices are successfully locked in act 840, the process proceeds to act 850 wherein the state of each source/target pair is updated. The state may be kept anywhere, and in one embodiment is stored by updating the data structure (FIG. 7) stored in the data repository, which may reside in a persistent storage device to withstand failure. In one embodiment, the state is updated to reflect that a migration request for the devices is "synchronizing". The initial "synchronizing" state indicates that the migration request has been received, but the migration for the pair has not yet been further processed as discussed below. The number of states may vary with more or less process granularity as desired. The present invention is not limited to any particular implementation in this respect. When the process is unable to successfully access or write to the storage space for the status, it proceeds to act 855, wherein the process unlocks the source and target devices, returns an error indicating that the migration was unsuccessful, and the process terminates.

When the write to the repository in act 850 succeeds, the process proceeds to act 865, wherein it determines whether the number of currently pending source/target pair migrations exceeds a predefined maximum number. As discussed above, in one embodiment a migration request may define (e.g., in the priority field 725 of the data structure) a maximum number of active source/target pair transfers as one way to limit the processing resources expended on data migration efforts (which may encompass more than one migration session) at any one time. In one embodiment, this maximum number may be increased or decreased at any time (including while a migration session is in progress) by updating the request, and therefore the data structure which defines the session.

When it is determined in act 865 that the maximum number is not met or exceeded, the process proceeds to act 870, wherein it begins the transfer of data from the source to the target (i.e., the source and target are "synchronized") by invoking the migration method specified for the pair. The process may invoke the migration method in any number of ways. As discussed above, in one embodiment the agent is given access to the program libraries of the facilities which transfer the data, and can thus invoke the appropriate routines as needed. In other embodiments, the agent may utilize an application programming interface (API) to instruct a program executing on a host computer, storage system (e.g., storing the source or target), networking device (e.g., a switch) or other component to perform the data movement. The interface to the migration method is generically referred to in FIGS. 8A and 8B as a "primitive" that is called to invoke the method. As discussed above, numerous migration methods are possible, including host-based copy (e.g., using an application on the host, a driver in the I/O stack as discussed in the above-referenced application Ser. No. 10/122,556, or the capabilities of an LVM), a storage device-based transfer (e.g., using a mirroring facility such as the Symmetrix Remote Data Facility offered by EMC Corporation), a network device-based transfer (e.g., using a utility for this purpose executing on a switch), or other data transfer utility accessible to the agent.

After the migration method primitive is called in act 870 to invoke the method, the process proceeds to act 880 wherein the process verifies that the migration method has started correctly. If a problem is encountered, the process proceeds to act 890 wherein actions are taken to halt the migration because it cannot complete as specified. For example, the process may update the data repository to reflect that the overall session is aborted. The process may also abort the ongoing synchronizations of other source/target pairs in the session, unlock each source/target pair and return an error. Although the entire session is aborted in the above-discussed embodiment of FIGS. 8A and 8B, the present invention is not limited in this regard. In another embodiment, the agent may abort only the pair in question while allowing other source/target pairs to continue, and may return a notification that the facility specified for the source/target pair in question could not be invoked. The user or process that initiated the migration may then select another migration method for the failed pair and re-attempt the migration.

When it is determined in act 880 that the synchronization has successfully begun, the process proceeds to act 8100 wherein the data repository is updated to reflect the updated state of the source/target pair in question (i.e., that the pair is synchronizing). If the update of the data repository fails for any reason, the process again proceeds to act 890 wherein actions are taken to halt the migration as discussed above.

When the update to the data repository in act 8100 succeeds, a determination is made (in act 8100) as to whether any pairs remain to be processed. When none remain, the process proceeds to act 8110, wherein it completes and returns a message indicating that it completed successfully.

When it is determined in act 8100 that more pairs remain, the process returns to act 865 where it begins to process the next source/target pair. For each source/target pair remaining in the migration session, the process determines (act 865) whether starting the pair exceeds the maximum number of migrations, and if not, the process begins the migration (act 870), validates that it has begun correctly (act 880), and updates (act 8100) the data repository to reflect that the migration has begun.

When a determination is made during processing of a source/target pair at act 865 that the maximum number of migrations is met or exceeded, the process proceeds to act 868, where the state of the pair is changed (e.g., by updating the data repository) to "queued". Pairs in this queued state will be processed at a later time by another process as discussed below with reference to FIGS. 13A and 13B. If the process encounters an error in updating the state of a source/target pair to queued, the process proceeds to act 890 wherein the process aborts as discussed above.

When an update succeeds at act 868, the process proceeds to the next source/target pair and returns to act 865 to determine whether the maximum number of migrations is met or exceeded. In this respect, because one or more migrations may have completed since the last time a determination was made as to whether the maximum number had been met, even if the maximum number of migrations was met or exceeded when a prior pair was processed, it may be possible for the migration of the currently processed pair to begin.

In the manner discussed above, the process loops through acts 865, 870, 880, and 8100 and/or acts 865 and 868 until all pairs have begun synchronizing or placed in a queued state, where the pair(s) await further processing as discussed below.

2. Initiating Migration for Queued Source/Target Pairs

As discussed above, queued pairs have not yet begun synchronizing. Thus, in one embodiment, a technique is employed whereby queued pairs are revisited to begin synchronization of those pairs.

Figure 13A:
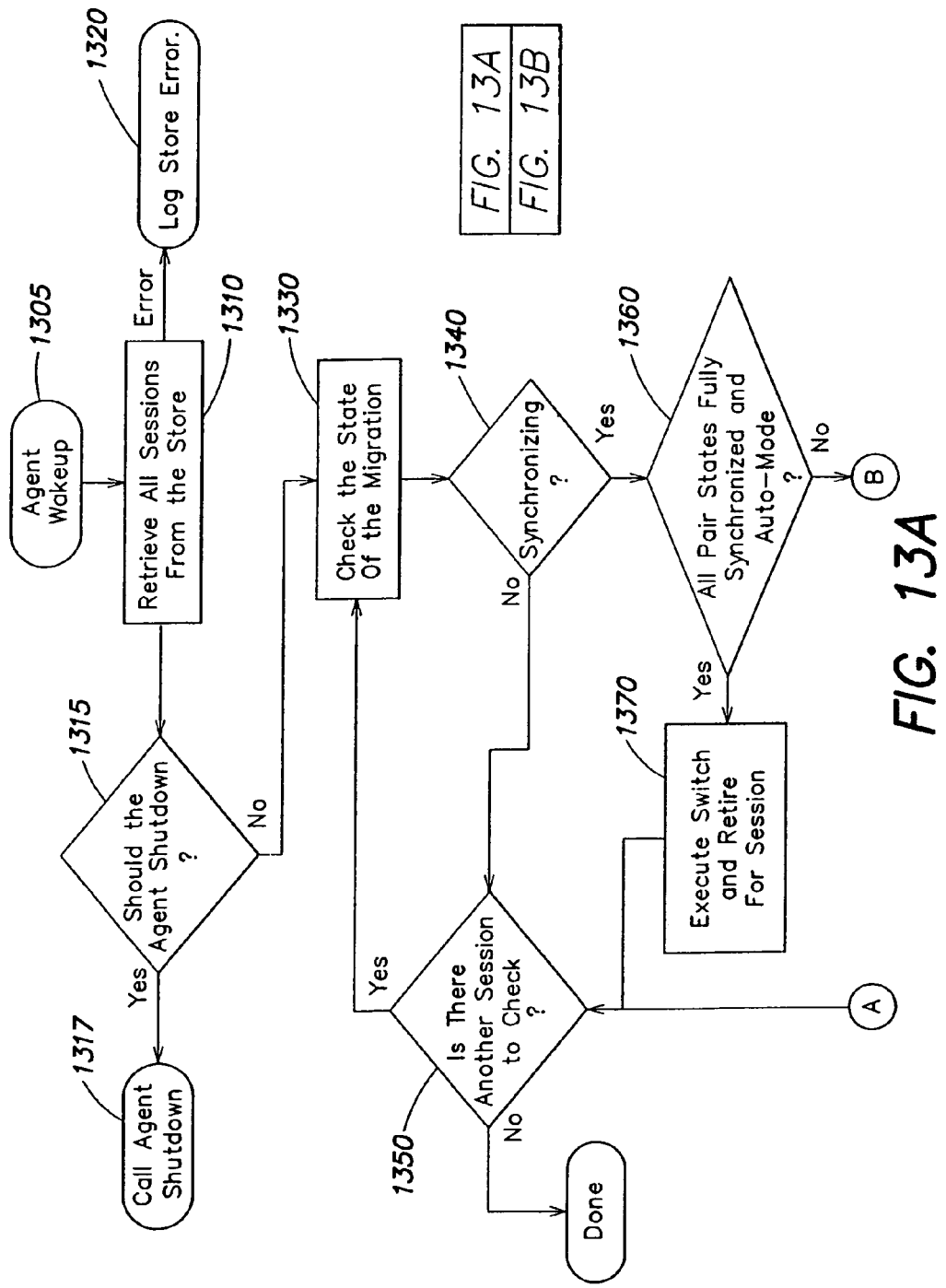
FIGS. 13A and 13B collectively represent a flow diagram depicting a process executed at wakeup by a migration agent used to manage a migration process in accordance with one embodiment of the invention.
Figure 13B:
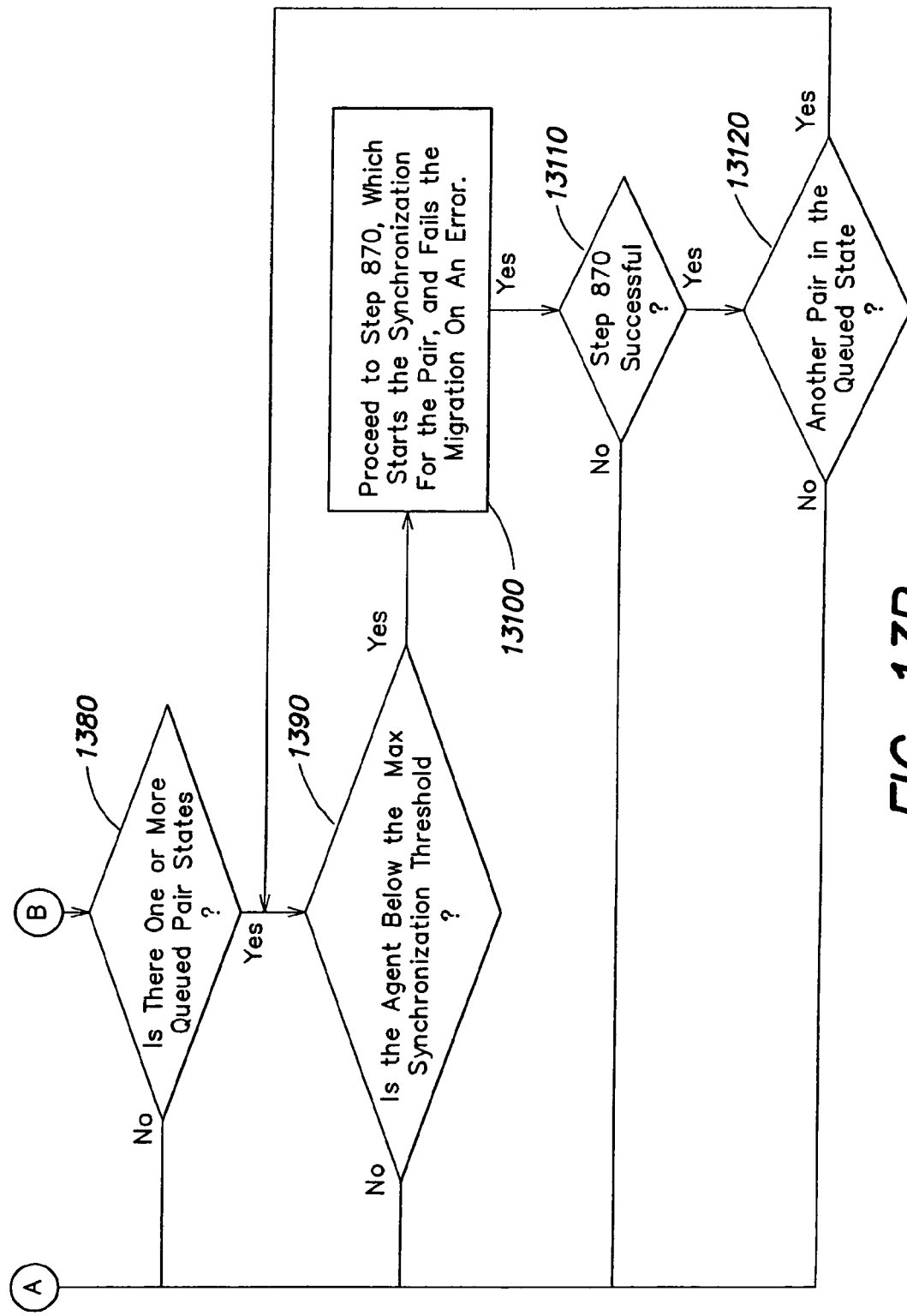

FIGS. 13A and 13B depict an illustrative embodiment of a process (which can, for example, be executed by an agent) to process queued source/target pairs. The embodiment depicted is exemplary, as the invention may be implemented in a number of ways. In the embodiment depicted, the process begins at act 1305 with agent wakeup. In one embodiment, it is not necessary for the agent to execute at all times, so it may be beneficial for the agent to "sleep" (i.e., be inactive) for periods so as not to occupy system resources during that time. The agent may "awake up" periodically or upon predetermined events to, for example, see if any source/target pairs have completed synchronizing so that the agent can initiate the auto-switch and retire process. In one embodiment, each time the agent awakens it executes the process of FIGS. 13A and 13B, to begin the migration of as many source/target pairs as possible. It should be appreciated that the invention is not limited in this respect, as the agent may never cease executing, or may otherwise not require a wakeup routine.

Agent wakeup may be triggered by any of a number of occurrences. For example, a wakeup routine may start an agent after a predetermined period of inactivity (e.g., every ten minutes), when a certain event occurs (e.g., the completion of one or more source/target pair migrations), when a user sends the agent a request (e.g., a request to shut down, or to modify one or more parameters governing a migration session), or upon any other suitable occurrence.

When the agent wakes up, in act 1310 it attempts to ascertain the status of the migration session. In one embodiment, it does this by retrieving information related to the migration session from the data repository, which may have been updated by another process while the agent was asleep. As discussed above, other processes may update the repository. When the agent is unable to access the data repository, the process proceeds to act 1320 wherein it returns an error (e.g., by reflecting this failure in a log) and terminates.

When the process successfully accesses the data repository in act 1310, it proceeds to act 1315, wherein the agent determines whether it should invoke a shutdown procedure. In one example, the agent may shut down because it has reviewed an instruction from the user to do so. In another example, the retrieval of data from the data repository may reveal that there are no sessions in progress, and therefore that there are no actions for the agent to take. When the process determines that it should shut down the agent, it proceeds to act 1317 wherein it invokes a routine to shut down the agent, and terminates.

When it is determined in act 1315 that the process should not shut down, the process proceeds to act 1330 wherein it determines the global state of each ongoing migration session. In one embodiment, for each session selected, the agent aggregates the pair states to determine a global session state. There are numerous ways of performing this aggregation, and the invention is not limited to any particular technique. In one embodiment, if at least one source/target pair is actively synchronizing or is queued, then the global state will be set to "synchronizing" to indicate that the agent may have work to do for the session.

After the global state for the session is determined, the process proceeds to act 1340, wherein a determination is made as to whether the global state of the migration session is actively synchronizing.

When it is determined that the session being processed is not actively synchronizing, the process proceeds to act 1350, wherein it determines whether other sessions should be checked (i.e., whether other ongoing sessions are under its purview). If there are no others to check, the process terminates (e.g., the agent reverts back to sleep mode). When there are other sessions to check, the agent returns to act 1330, wherein it begins processing a next session.

When the process determines in act 1340 that the migration session has a global state of synchronizing, it proceeds to act 1360, wherein it determines whether each source/target pair has been fully synchronized and the auto-switch option has been selected (e.g., from the information retrieved from the data repository in act 1310). When the auto-switch option has been selected and all pairs are fully synchronized, the process proceeds to act 1370 wherein it executes the auto-switch and retire process for the session. An illustrative auto-switch and retire process is described below with reference to FIG. 9.

When the process determines in act 1360 that all pairs are not fully synchronized, or that the auto-switch option is not selected, the process proceeds to act 1380 wherein the process determines (e.g., from the information retrieved from the data repository in act 1310) whether any source/target pairs are queued. When none are queued, the process proceeds to act 1350, wherein it determines whether another session should be checked in the manner discussed above.

When it is determined in act 1380 that at least one source/target pair is queued, the process proceeds to act 1390, wherein it determines whether the number of ongoing migrations is below the maximum. When the number of migrations ongoing is not below the maximum, the process proceeds to act 1350, wherein it determines whether another session should be checked.

When it is determined at act 1390 that the number of ongoing migrations is below the maximum, the process (in act 13100) proceeds to acts 870-8100 in the process of FIGS. 8A and 8B, wherein the agent invokes the specified migration method for a first queued source/target pair. In acts 870-8100, the agent determines whether the synchronization has begun successfully, and if not, it aborts either the source/target pair migration or the migration session overall as discussed above.

After acts 870-8100 have completed, the process proceeds to act 13110, wherein a determination is made as to whether the migration for the processed pair was begun successfully. When it was not, the process proceeds to act 1350 to determine whether another session should be checked. When it is determined in act 13110 that the migration was begun successfully, the process proceeds to act 13120 wherein it determines whether another source/target pair exists in a queued state. If so, the process returns to act 1390 to process a next pair in the manner discussed above. If no more pairs exist, the process proceeds to act 1350, wherein it determines whether another session should be checked.

3. Pausing a Migration Session

Figure 11:
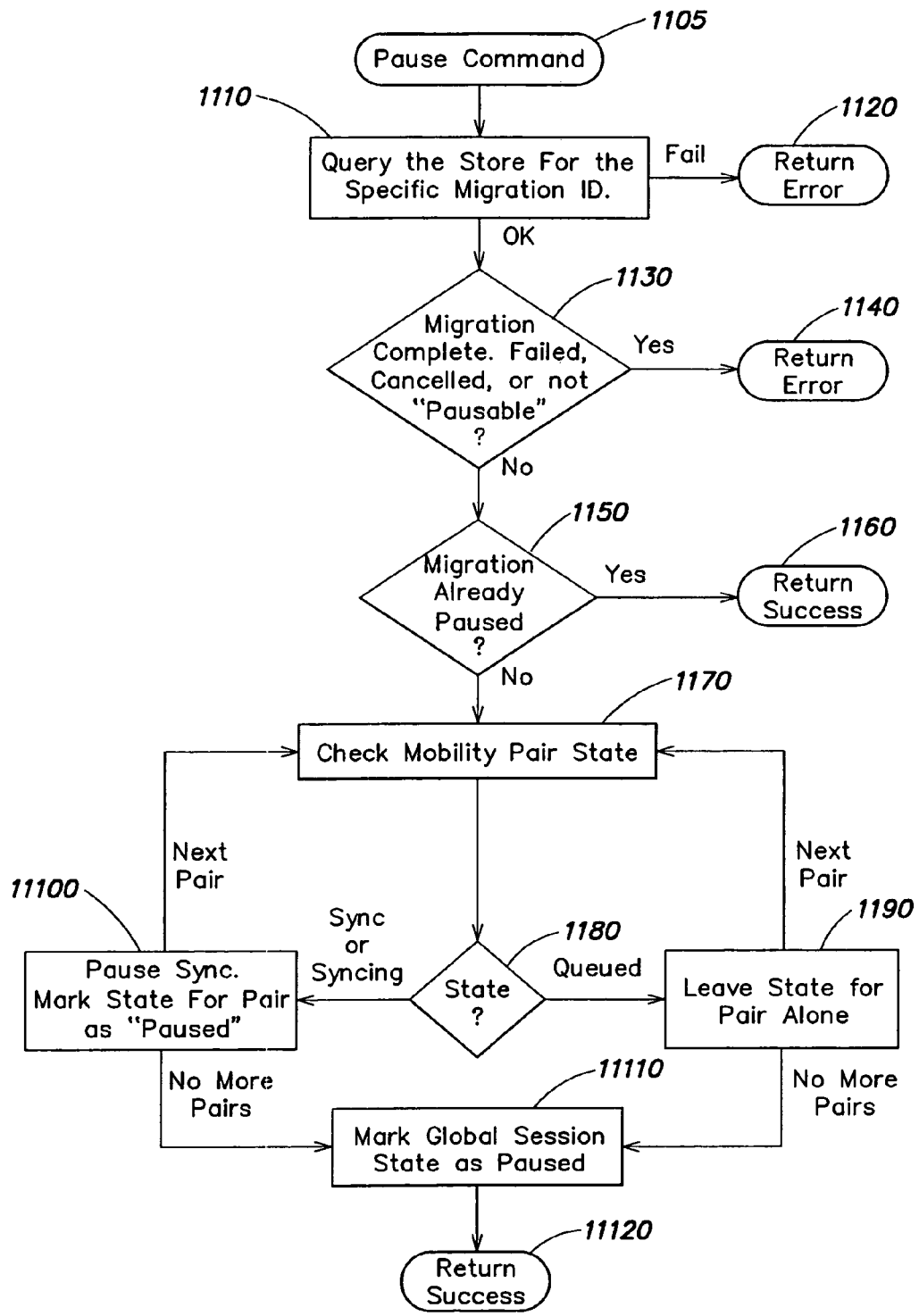
FIG. 11 is a flow diagram depicting a process used to pause a migration session in accordance with one embodiment of the invention.

As discussed above, in one embodiment the capability to pause a migration session is provided. The invention is not limited in this regard, as other implementations need not provide such a capability. FIG. 11 depicts one embodiment of a process performed by the agent to pause a migration session. The depicted process is merely exemplary, as other implementations are possible.

In act 1105, the agent receives a pause command. The pause command might be issued by a number of different entities and for a number of different reasons. For instance, a user might issue a pause command if the migration session is occupying an inordinate amount of processing resources, causing other system operations to proceed too slowly. Without the benefit of a pause command, a user would be forced to abort the migration entirely (thereby sacrificing progress already made), or allow it to continue despite the undesired impact on system performance. The pause capability provides greater flexibility and control over the migration and its impact on system performance.

When the pause command is received by the agent, in act 1110 the process retrieves information related to the migration session (e.g., from the data repository). When that retrieval is unsuccessful, the process proceeds to act 1120 wherein it returns an error (e.g., by returning an error message to the user and/or recording an error message in a system log).

When information related to the session is successfully retrieved, the process proceeds to act 1130, wherein the agent ascertains whether the migration is in progress and can be paused. Conditions which may prevent a session from being paused include its having already completed, failed or having been canceled. In addition, a session may not be pause-able if it utilizes (at least in part) a migration method which cannot be paused (e.g., some hardware mirroring facilities may not permit pausing). However, the invention is not limited in this respect. In one embodiment, if the process determines that one or more pairs cannot be paused but others can, it will pause those pairs that it can. When the process determines in act 1130 that the session cannot be paused, the process proceeds to act 1140, wherein it returns an error.

When the process determines in act 1130 that the migration session can be paused, it proceeds to act 1150, wherein it ascertains whether the migration has already been paused. If it has already been paused, the process returns a message in act 1160 indicating successful pausing of the session.

When it is determined in act 1150 that the migration has not already been paused, the process proceeds to acts 1170 and 1180, wherein it checks the state for a first source/target pair in the migration session. The source/target pairs may be chosen in any order using any method. When it is determined that the chosen source/target pair is actively synchronizing (i.e., its state is "sync") or that a request has been received to synchronize the pair but actual data transfer has not yet begun (i.e., its state is "synchronizing"), the process goes to act 11100 wherein it pauses the migration method used for that pair and updates the data repository to reflect that the pair is paused. The pair may be paused in any of numerous ways, which may depend on the migration method used for the pair. It should be appreciated that a pause-able method should provide the capability to determine at what point in the migration the pause command was received, so that the migration can be restarted from that point. After the pair is paused, the process determines (in act 11100) whether any pairs remain. If so, the process goes to the next pair and returns to act 1170.

When it is determined in act 1180 that the source/target pair is queued, the process proceeds to act 1190 wherein the agent leaves the state of the pair unchanged, since there is no migration activity to pause. The process then determines (in act 1190) whether any pairs remain and, if so, goes to the next pair and returns to act 1170.

When it is determined in either act 11100 or 1190 that all applicable pairs have been processed, the process proceeds to act 11110, wherein it updates the data repository to reflect the global state for the migration session as paused. The process then proceeds to act 11120, wherein it returns a message (e.g., to the user and/or in a system log) that the pause has completed successfully.

In one embodiment, a migration session may be paused more than once. This may be useful in that it may provide for scheduling migration activities during periods of light system activity. For example, a migration executing at night can be paused when the business day begins, restarted (as discussed below) at lunchtime, paused again in the afternoon, then restarted in the evening. This scenario is merely exemplary, as the number of times that a migration session may be paused is unlimited.

4. Restarting a Migration Session

Figure 12:
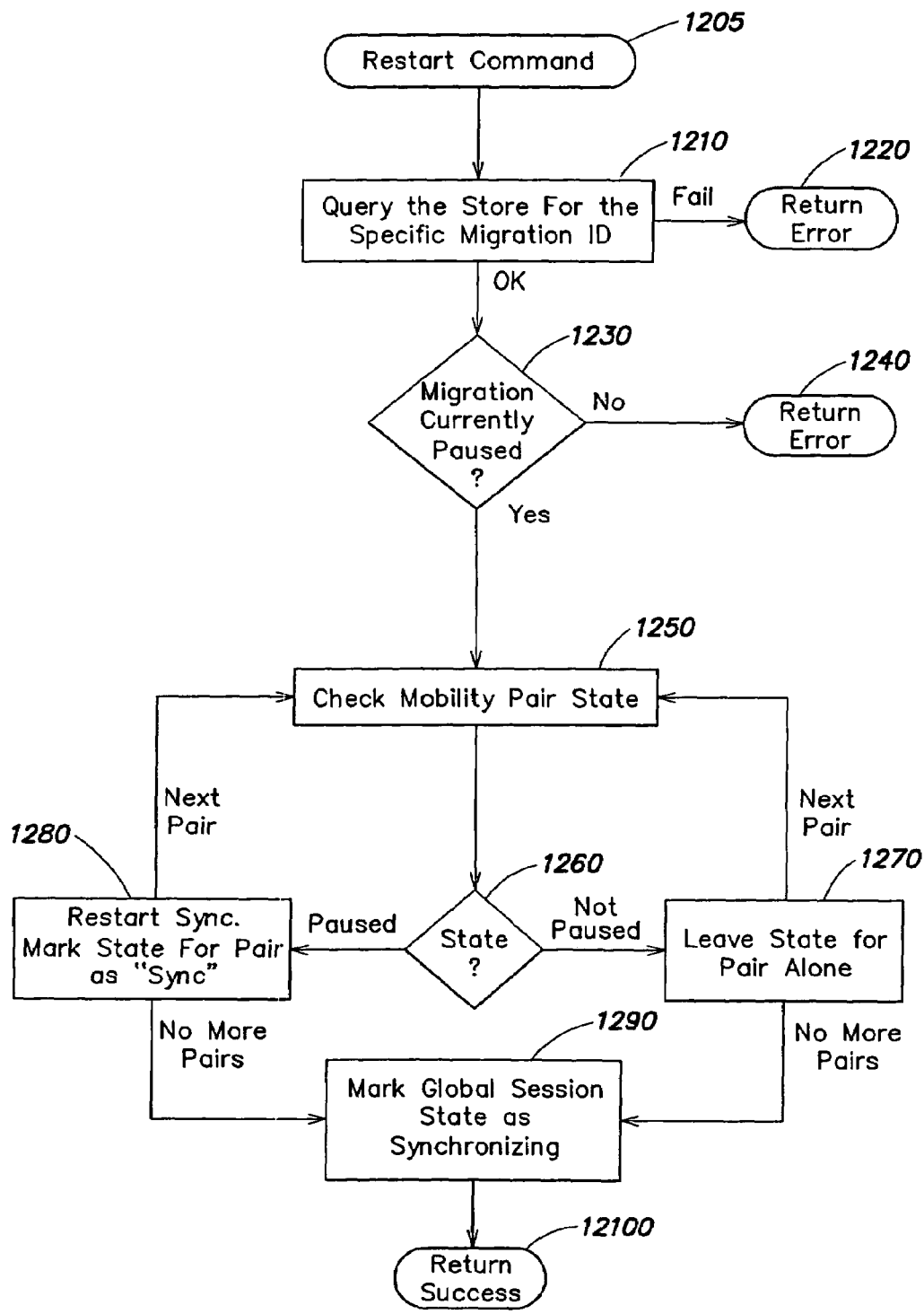
FIG. 12 is a flow diagram depicting a process used to restart a paused migration session in accordance with one embodiment of the invention.

FIG. 12 depicts one embodiment of a process through which the agent resumes a previously paused process. The depicted embodiment is merely exemplary, as restarting a process can be performed in numerous ways. In act 1205, the agent receives a restart command. The restart command may be issued by a user, management tool or other entity.

In response to receipt of the restart command, in act 1210 the process retrieves information related to the migration session from the data repository. If that retrieval is unsuccessful, the process proceeds to act 1220 wherein it returns an error (e.g., to a user and/or in a system log).

When the retrieval is successful, the process proceeds to act 1230, wherein it determines whether the migration session is currently paused. If the session is not paused, the process returns an error to this effect in act 1240.

When it is determined in act 1230 that the migration session is currently paused, the process proceeds with a series of acts analogous to several described with reference to FIG. 11. In acts 1250 and 1260, the process checks the state for a first source/target pair in the migration session. As with the process of FIG. 11, the source/target pairs may be processed in any order. When it is determined in act 1260 that the considered source/target pair is currently paused, the process proceeds to act 1280, wherein it restarts the migration method used for that pair, and updates the data repository to reflect that the pair is actively synchronizing. The process then determines (in act 1280) whether more pairs remain to be processed, and if so, goes to the next pair and returns to act 1250.

When it is determined in act 1260 that the source/target pair is not paused (e.g., if the considered pair is utilizing a migration method which can not be paused), the process proceeds to act 1270, wherein the process leaves the state of the pair unchanged, since there is no paused activity to restart. When there are more pairs to examine, the process returns to act 1250 to check the next pair's state.

When it is determined in act 1270 or 1280 that all source/target pairs have been processed, the process proceeds to act 1290, wherein the process updates the data repository to reflect the global state of the migration session as actively synchronizing. The process then proceeds to act 12100, wherein it returns a message (e.g., to a user and/or a system log) indicating that the session has been restarted successfully.

5. Canceling A Migration Session

Figure 10:
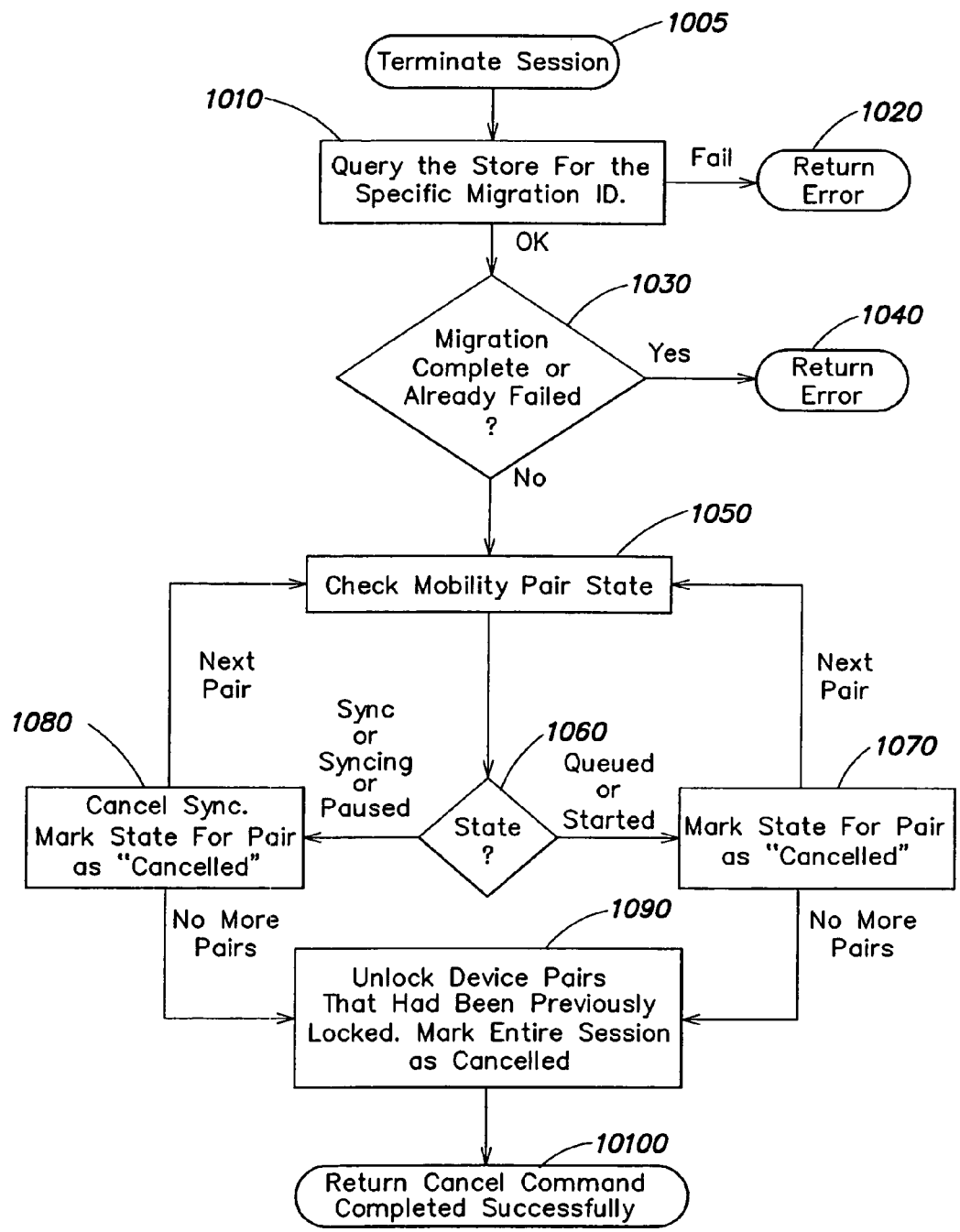
FIG. 10 is a flow diagram depicting a process used to cancel a migration session in accordance with one embodiment of the invention.

In one embodiment, a migration session may be cancelled. The invention is not limited in this regard, as other implementations need not provide this capability. FIG. 10 depicts an illustrative embodiment of a process through which a migration session may be cancelled. The embodiment of FIG. 10 is merely exemplary, as other implementations may be employed to cancel a migration session.

In act 1005, the agent receives a command to terminate or cancel the session. The cancel command may be issued by a user, management tool or other entity. In response to the cancel command, in act 1010 the process retrieves information related to the migration session from the data repository. When that retrieval is unsuccessful, the process proceeds to act 1020, wherein it returns an error.

After successful retrieval, the process proceeds to act 1030, wherein it determines whether the migration session in question has already completed or failed, and thus cannot be cancelled. If it has completed or failed, the process proceeds to act 1040 to report an error.

When it is determined in act 1030 that the migration session has not already completed or failed, the process proceeds to acts 1050 and 1060, wherein it ascertains the state for a first source/target pair in the migration session. As with the process depicted in FIG. 12, the source/target pairs may be chosen in any order and using any method. When it is determined that the source/target pair is paused, actively synchronizing, or that a request has been received to synchronize but data transfer has not yet begun, the process proceeds to act 1080, wherein the agent cancels the migration method for that pair (e.g., by calling the migration method and instructing it to cancel), and updates the data repository to reflect the state for the pair as canceled. The process then (in act 1080) determines whether other pairs remain, and if so, goes to the next pair and returns to act 1050.

When it is determined in act 1060 that the state of the source/target pair is queued or started (i.e., the request to perform the migration between the pair has been received, but the pair is not yet actively synchronizing), the process proceeds to act 1070, wherein the process updates the data repository to reflect the state of the pair as canceled. No action is taken in act 1070 to cancel any migration process for the pair, because the migration method is not active. After the data repository is updated, the process (in act 1070) determines whether there are other pairs to examine, and if so, returns to act 1050.

When it is determined at act 1070 or 1080 that all source/target pairs have been processed, the process proceeds to act 1090, wherein it unlocks each source/target pair to make them available for another migration. As discussed above, in one embodiment, this can be done by updating the data repository to reflect that each device is no longer locked. Once all devices are unlocked, the process updates the data repository to reflect the global state of migration session as being canceled and proceeds to act 10100, wherein the process reports that cancellation was successful (e.g., by presenting a message to this effect to the user and/or recording a message to this effect in a system log).

6. Auto-Switch and Retire Function

As discussed above, in one embodiment the agent can manage a migration process with an auto-switch and retirement capability, wherein data access attempts are automatically switched to the target location, without reconfiguring host computers, at the completion of the migration.

Figure 9:
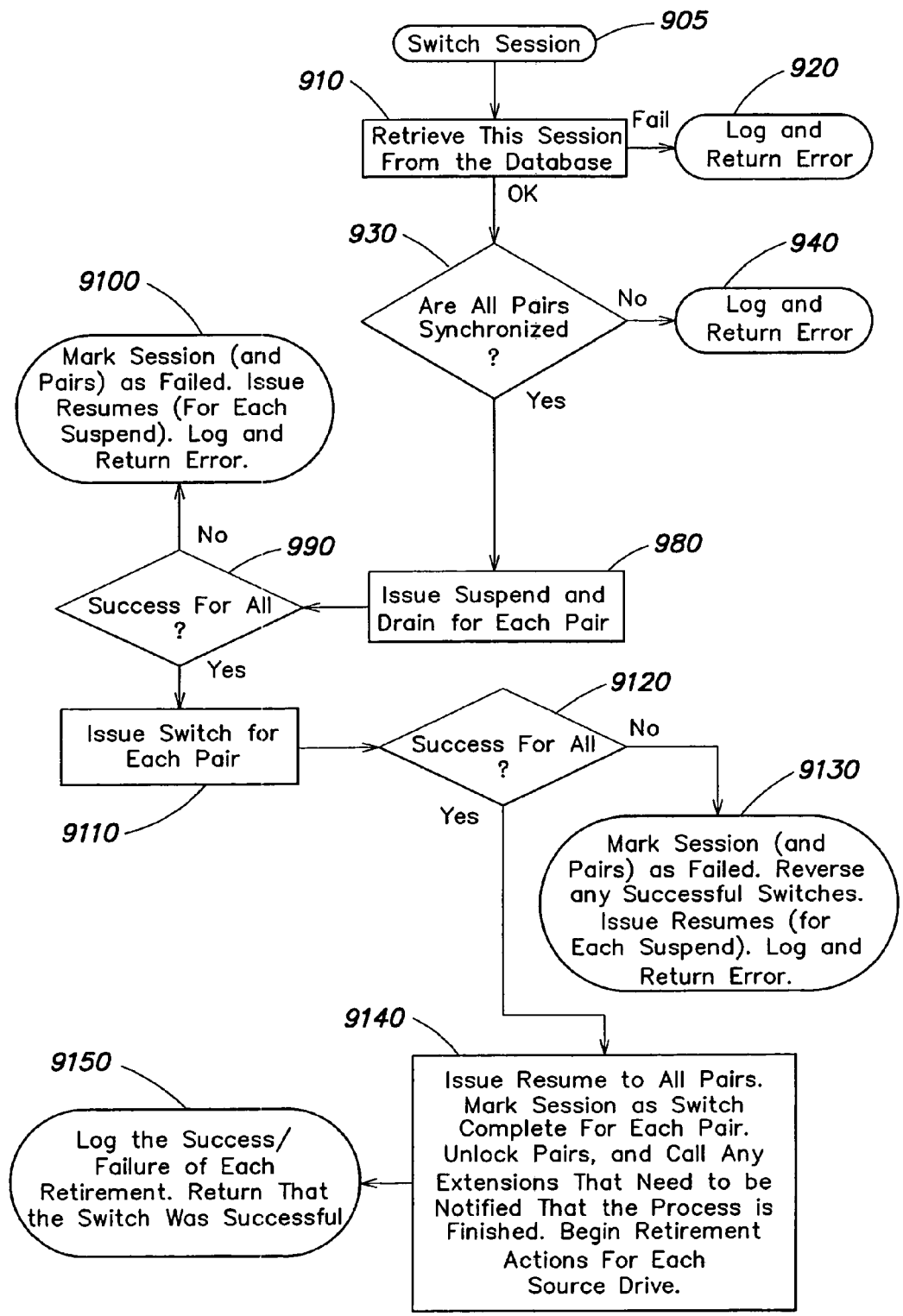
FIG. 9 is a flow diagram of a process used to automatically switch from each source to each target at the completion of a migration session in accordance with one embodiment of the invention.

FIG. 9 depicts an illustrative process to manage the auto-switch function and retirement of the source storage resource. The depicted embodiment is merely exemplary, as the auto-switch and retirement process may be performed in numerous ways. In the embodiment shown in FIG. 9, the agent performs an auto-switch and retire only when the entire migration session has completed. However, the invention is not limited this respect, as the agent can alternatively perform this process on a subset of the source/target pairs (e.g., one at a time) at the completion of their respective migrations.

The process may be initiated in response to the agent detecting that synchronization for all pairs is completed for a migration session when the data structure specifies that an auto-switch be performed. Alternatively, this process may be initiated in response to an auto-switch command received from a user. Such a command may be submitted when the user sees that all source/target pairs comprising a migration session have been synchronized. Other techniques for initiating an auto-switch process may be used, as the invention is not limited to any particular technique.

When the auto-switch process is initiated, in act 910 the process retrieves information related to the migration session from the data repository. When that retrieval is unsuccessful, the process proceeds to act 920, wherein it returns an error (e.g., by presenting a message to a user and/or recording an error message in a system log).

When the retrieval is successful, the process proceeds to act 930, wherein it determines whether all the source/target pairs comprising the migration session have completed synchronizing, and if not, the process proceeds to act 940 to return an error. As discussed above, in other embodiments the process may execute the auto-switch for a subset of source/target pairs, so acts 930-940 need not be performed for those embodiments.

When it is determined in act 930 that all pairs have been synchronized, the process proceeds to act 980, wherein for each source/target pair for which the auto-switch is to be performed, the process initiates a "suspend and drain" process. Such a process is described in the above-referenced application Ser. No. 10/122,556. In this process, all future input/output requests directed at the source volume(s) are temporarily suspended (in one embodiment, these requests are queued in sequence for subsequent processing against the target volume(s)), and all pending requests are executed (i.e., drained) until no I/O requests remain pending. With some migration methods (e.g., a logical volume manager), a suspend and drain process may not be required, as the migration method itself may provide for temporarily discontinuing I/O requests.

After issuing the suspend and drain, the process proceeds to act 990, wherein it determines whether the suspend and drain process was successful for each source volume. If it was not successful, the process proceeds to act 9100 to take appropriate action. In the embodiment shown, the process updates the data repository to reflect the global state of the migration session as having failed. In an alternative embodiment, the process can update the data repository to reflect that only the source/target pair subset(s) for which the suspend and drain was unsuccessful. In act 9100, the process also takes action to allow access to the source volume(s) to resume, so that the applications are not indefinitely held up by suspended I/O requests. Finally, the process may return an error (e.g., by presenting a message to the user and/or recording an error message in a system log).

When it is determined at act 990 that the suspend and drain was successful for each source/target pair, the process proceeds to act 9110, wherein it initiates a switch for each source/target pair, so that I/O requests directed at the source volume(s) are redirected to the target volume(s). The switch may be accomplished in any number of ways, as the invention is not limited to any particular technique. In one embodiment for use with the redirection technique described in above-referenced application Ser. No. 10/122,556, the process may accomplish the switch by issuing a command to the base driver on the host computer(s).

The process then proceeds to act 9120 to determine whether the switch was successful for all source/target pairs in question, and if not, proceeds to act 9130. In act 9130, the agent updates the repository to reflect the global state of the migration process as having failed, and returns an error to that effect. In addition, the process reverses any successful switches, and resumes I/O to all of the source volume(s).

When it is determined in act 9120 that the switch was performed successfully for the source/target pairs in question, the process proceeds to act 9140, wherein it instructs the host computer(s) to resume I/O (which will now be directed at the target volume(s)). The process also updates the status information in the data repository to reflect that the switch is complete for each source/target pair, unlocks the source/target pairs so that other migration sessions may access the devices if desired, and notifies any other processes executing on the computer system that should be notified that the migration has completed. Examples of the types of processes that may be notified in act 9140 include the migration method, which may then perform some clean up operation associated with the migration.

When it has been instructed to do so (either via the data structure or a direct command), in act 9140 the process also initiates source retirement. Source retirement may be performed in any number of ways, as the invention is not limited to any particular technique.

7. Start Up

Figure 14:
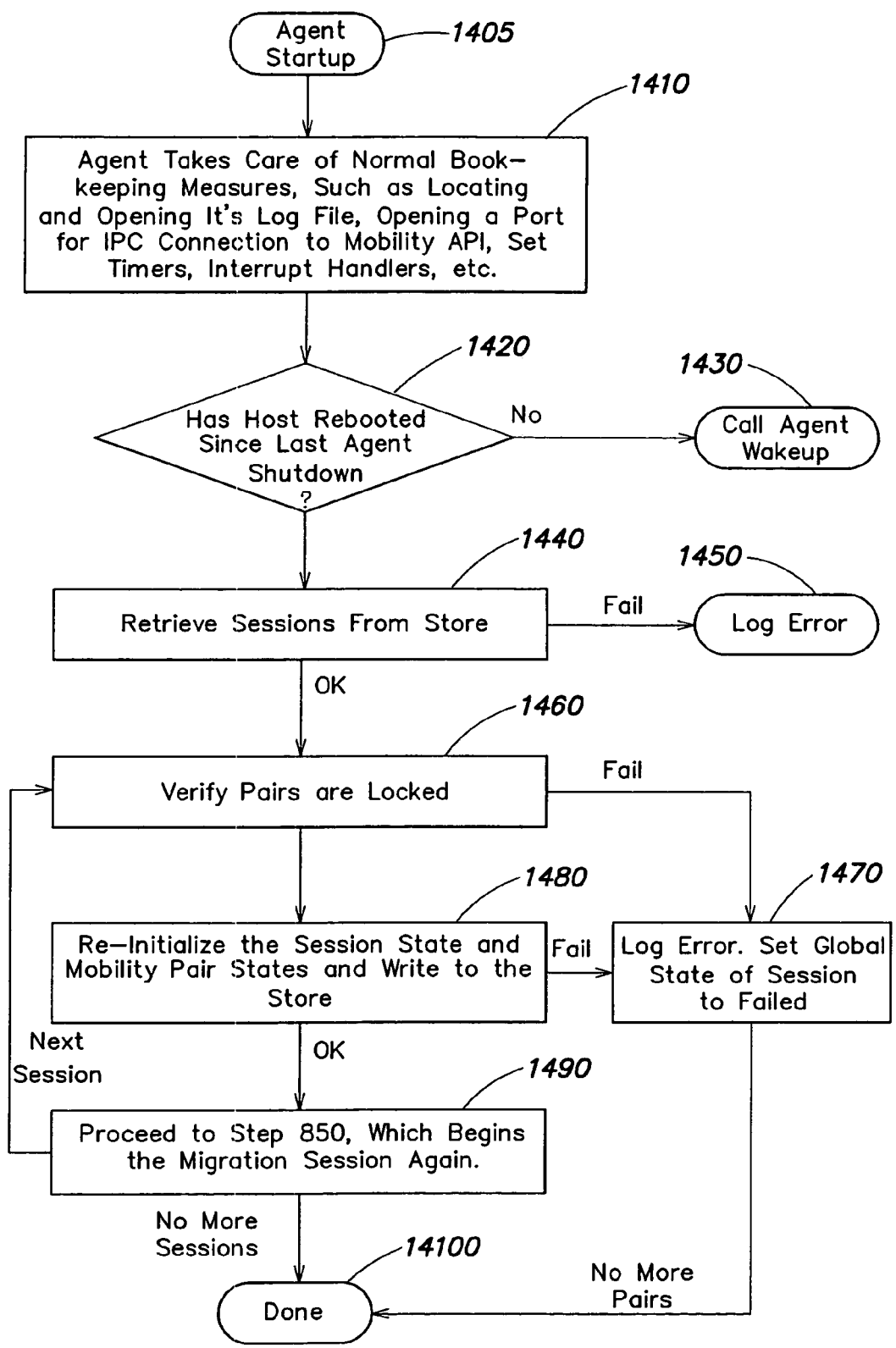
FIG. 14 is a flow diagram depicting a process executed at startup by a migration agent in accordance with one embodiment of the invention.

The startup process is to be distinguished from the wakeup routine described with reference to FIGS. 13A and 13B, and is executed when the agent is started, either initially or following a system failure. FIG. 14 depicts one embodiment of a process performed by the agent upon startup. This process is merely exemplary, as numerous other implementations for a startup process are possible.

In act 1405, the agent receives a command to start up and proceeds to act 1410. In act 1410, the process performs a number of bookkeeping measures. For example, the process may locate and open any log files to be used, open a port for inter-process communication (IPC) with one or more APIs, set timers and interrupt handlers, and perform other similar acts.

The process then proceeds to act 1420, wherein it determines whether the host computer which executes the migration session being managed has re-booted since the last agent shutdown. This determination is made because a reboot of the host may have resulted from a failure of the host during an active migration, so that the process may perform certain acts discussed below in response. The determination of whether the host rebooted since the last agent shutdown is merely one example of a technique for determining a potential host failure during a migration, as other techniques are possible.

When it is determined in act 1420 that the host has not rebooted since the last agent shutdown, the process proceeds to act 1430 wherein it calls the wakeup routine of FIGS. 13A and 13B to determine the state of migrations currently outstanding, and to determine whether there is action for the agent to take, as discussed above.

When it is determined in act 1420 that the host has rebooted since the last agent shutdown, the process proceeds to act 1440, wherein it attempts to retrieve information on all ongoing migration sessions from the data repository. If the agent is unsuccessful in doing so, the process proceeds to act 1450, wherein it reports an error to that effect (e.g., to the user and/or in a system log).

When the retrieval of information on the session is successful, the process proceeds to act 1460, wherein it determines whether each source/target pair within the migration session is still locked. When the agent determines that any of the source/target pairs are no longer locked, the process proceeds to act 1470, wherein the agent reports an error (e.g., by a message to the user and/or in a system log), updates the data repository to reflect the global state of the migration session as having failed, and concludes the process.

As discussed above, in one embodiment the process is capable of managing each source/target pair migration independently. Thus, in an alternate embodiment, the process may determine that only the pairs which are unlocked have failed, and those which remain locked may be re-initiated.

When it is determined in act 1460 that all source/target pairs remain locked, the process proceeds to act 1480 wherein the process prepares the synchronization to begin anew by updating the data repository to reflect the state of the pairs as synchronizing (i.e., to reflect that a migration session request has been received for the pair, but that data transfer has not yet begun). If the update to the repository fails, the process proceeds to act 1470 to report an error.

When the data repository has been updated, the process proceeds to act 1490, wherein it begins the migration session again by proceeding to act 850, described above with reference to FIGS. 8A and 8B. After the completion of act 1490 for the first migration session, in one embodiment the process proceeds to the next session, if one exists. The process then loops through acts 1460, 1480 and 1490 for each remaining session until it is determined in act 1490 that all sessions have been processed. At this point, the process proceeds to act 14100, wherein the process terminates.

In one embodiment, if the migration session is one which saves state during operation, a migration session may be restarted from the point at which it failed. Although advantageous, the present invention is not limited in this respect, as the migration session can, alternatively, be restarted from the beginning.

In one embodiment, if the migration method is one which would not have been interrupted by a failure of the host (e.g., a hardware mirroring facility implemented by the storage systems), it may not be necessary to take any action to re-initiate the migration method.

C. Agent and Data Repository Configuration

In one embodiment, the operation of a group of agents is coordinated by a central management facility, such as the above-described ECC management tool. However, the invention is not limited in this regard; among the possible operable agent configurations are those where the operations of one or more agents are coordinated by a single "master" agent. Alternatively, multiple agents may operate in parallel, function so that a management tool coordinates the operations of only a subset of all agents deployed, and other configurations. With source data which is accessed by more than one host computer (such as when host computers comprise a cluster, wherein multiple hosts act as a single system to enable high availability, load balancing and/or parallel processing), it may be advantageous to deploy multiple agents to work in concert.

In one embodiment, the agent operates in response to instructions provided by a user (which may be an administrator, although the invention is not limited in this respect). The user may provide these instructions via a graphical user interface (GUI) (e.g., provided by a management tool), which may allow the user to specify parameters for each source/target pair and/or the migration session overall. However, the invention is not limited in this respect, as other input facilities (such as a command line interface, or other suitably designed input facility) may be employed.

It should be appreciated that the facilities for migrating data discussed above are provided merely for illustrative purposes, and that numerous other facilities may be available in various computer systems. In one embodiment of the present invention, prior to beginning the initialization process, the particular technique for performing the movement operation can be manually provided by the administrator or utility that initiates the migration process. Alternatively, in accordance with one illustrative embodiment of the present invention, a technique is provided for automatically examining the nature of the resources available in the computer system, and automatically determining which would be most advantageous for use in performing the move operation. This can be performed in any of numerous ways.

IV. AUTOMATICALLY REDIRECTING ACCESS REQUESTS TO THE TARGET LOCATIONS

After the migration of the data is complete, in one embodiment, access requests directed toward the data set at the source location are redirected by the system to the target location. As with the other acts discussed above, the present invention is not limited to any particular technique for switching the computer system to begin accessing the migrated data set at the target locations. In accordance with one embodiment of the present invention, a technique is provided whereby access requests from the application (i.e., the database application 229 in FIG. 2) are automatically redirected to the target storage locations in a manner that does not require reconfiguration of the computer system. This technique is described in co-pending U.S. patent application Ser. No. 10/122,556, entitled "Method and Apparatus for Managing Access to Volumes of Storage," filed Sep. 10, 2002, which is incorporated herein by reference. As described therein, this redirection can be accomplished in the I/O stack of the host computer 223 to redirect access requests previously intended for the source locations (i.e., logical volumes 231,233 in storage system 225) to the target locations (i.e., logical volumes 235-236 in storage system 227).

V. SOURCE RETIREMENT

As discussed above, in accordance with one embodiment of the present invention, an optional act is performed wherein the source storage resources are retired, or otherwise made unavailable, following completion of the migration and the switching to the target storage resources. This retirement can be performed in any of numerous ways, and is intended to prevent the operating system on the computer having the applications that access the migrated data set from becoming confused if it detects a common identifier or metadata for two volumes of storage.

One example of a condition wherein it may be beneficial to retire the source storage resources relates to a computer system wherein multiple paths exist between the host computer and the storage system on which the source resources reside. In such a system that employs the PowerPath filter driver available from EMC Corporation, pseudonames are employed to provide a common representation for all of the paths over which a particular volume are accessible, whereas distinct native names are provided for each instance of a path that accesses the logical volumes. When the redirection techniques described above are employed, the I/O requests that are redirected are those directed to a pseudoname. Thus, if the operating system attempted to access one of the source volumes using a pseudoname, the access request would be redirected, and the operating system would not see the source storage resources. However, if the operating system attempted to access the source storage volumes using their native names (e.g., at boot time), the above-described redirection techniques would not be employed, such that the operating system could access the source storage locations directly. In such a circumstance, retiring the source storage locations may be advisable to avoid potential confusion by the operating system detecting more than one storage volume having a common identifier or other metadata.

The aspect of the present invention relating to retiring the source storage resources after the migration is not limited to any particular technique for implementing the retirement. For example, the storage locations to be retired can be zoned out, masked out or the storage resources can be made not ready (e.g., they can be taken offline).

VI. UNDOING A MIGRATION

As discussed above, one embodiment of the present invention is directed to enabling a migration to be undone after completion, so that the applications that access the data set can revert to accessing the data set from the source storage locations, as opposed to the target storage locations. It should be appreciated that this is advantageous in that if problems are detected with the target configuration, the data set need not be taken offline while the problem is corrected. Rather, the applications accessing the database can be reverted back to the source storage locations. It should be appreciated that the aspect of the present invention relating to the ability to undo a migration is not limited to any particular implementation technique, as any suitable technique can be employed. Thus, the implementations discussed below are provided merely for illustrative purposes, and are not intended to be limiting.

Figure 6:
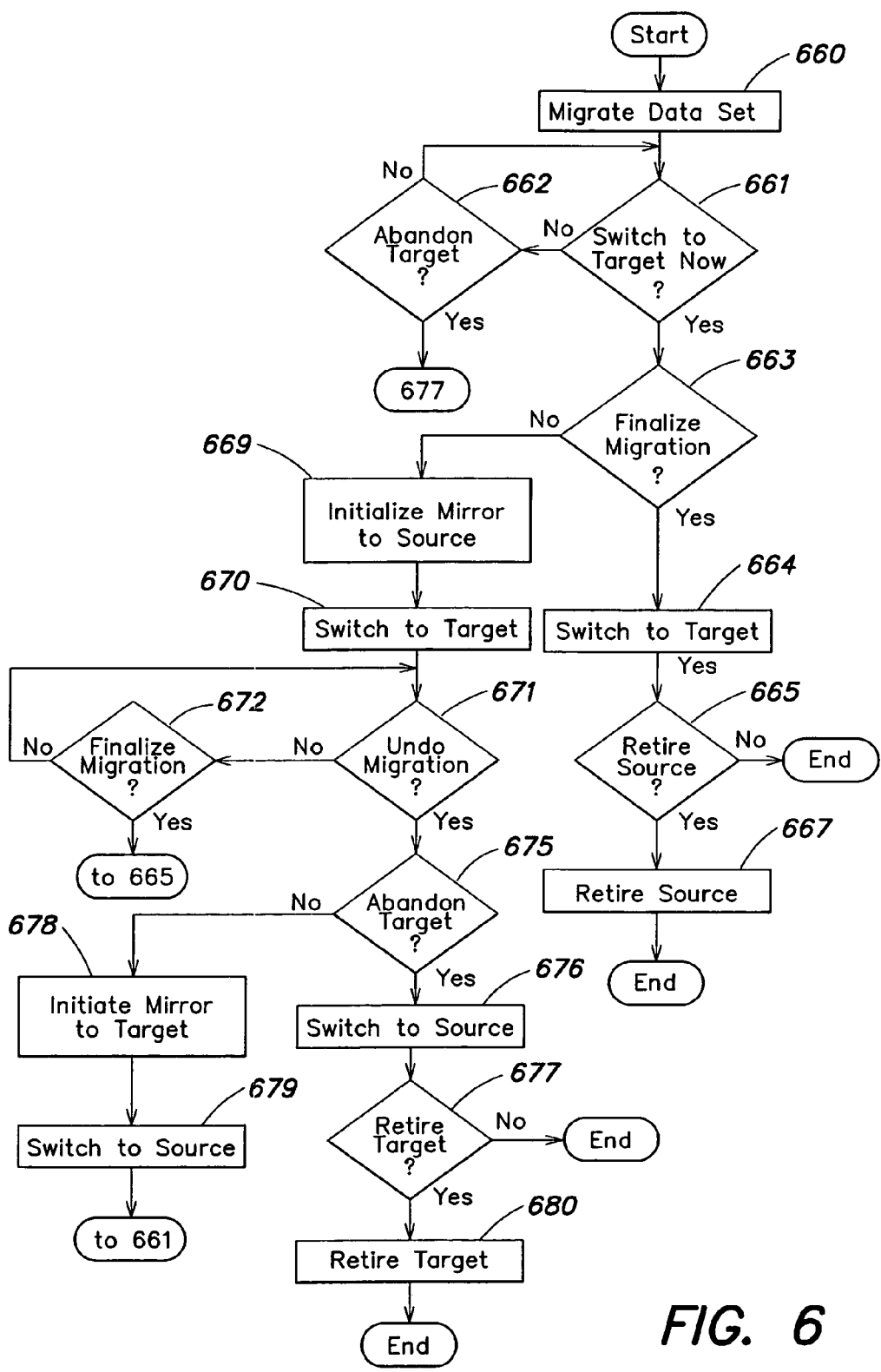
FIG. 6 is a flow diagram of a process that can "undo" a migration of a logical object in accordance with one embodiment of the invention.

One illustrative embodiment of a process for performing an undo of a data migration is illustrated in FIG. 6. In act 660, the data set is migrated. This migration can be performed in any of numerous ways, including using the embodiments of the present invention discussed above (e.g., acts 343-347 of FIG. 3), or using any other migration techniques, including manual or conventional techniques. The migration can include a copying of the data set from the source(s) to the target(s). It should be appreciated that the migration of the data set in act 660 (e.g., the actual copying of the data set) is considered to be accomplished by the process illustrated in FIG. 6, whether that process actually copies the data set itself or calls another process or utility to do so.

In act 661, the process determines whether to switch the applications that access the data set to access the data set from the target storage locations. This determination can be performed in any of numerous ways. In one example, the determination can be made manually by a system administrator. In another example, the process may automatically determine whether to perform an "auto-switch," as discussed above with reference to FIG. 7.

When it is determined at act 661 that the applications should not be switched, the process proceeds to act 662, wherein it determines whether to abandon the target (i.e., abandon the migration). This determination may also be made in any of numerous ways. For example, a system administrator may evaluate whether any potential problems with the migration can be corrected, and if so, may decide not to abandon the migration. When it is determined at act 662 that the target should not be abandoned, the process returns to act 661. In this manner, the process loops through acts 661 and 662 until it is decided to either switch to (act 661), or abandon (act 662), the target.

When it is determined at act 662 that the target should be abandoned, the process proceeds to act 677, which is discussed in detail below.

When it is determined at act 661 that the applications should be switched to the target, the process proceeds to act 663, wherein it determines whether the migration should be finalized. This determination can be made in any of numerous-ways. For example, the determination can be performed manually by a system administrator, who may only finalize the migration after the data set is up and running at the target storage locations in a manner that provides sufficient confidence that the migration has been completed successfully, or the migration may be finalized automatically (e.g., in response to a user preference that was previously established).

When it is determined in act 663 that the migration should be finalized, the process proceeds to act 664, wherein the applications are switched to the target(s). The act of switching the applications can be performed in any of numerous ways, including using the techniques described above (e.g., the automatic redirection in act 349 of FIG. 3), or any other suitable technique. In this respect, a technique for switching the applications to access the target(s) can involve the modification of at least one aspect of the computer system so that read requests to the data set are serviced from the target(s) rather than the source(s). The aspect of the computer system modified can include the applications themselves, or as discussed above in connection with the automatic redirection in act 349 of FIG. 3, can be another aspect of the system so that the switch occurs in a manner that is transparent to the applications.

After the switch to the target in act 664, the process proceeds to act 665, wherein it determines whether the source storage locations should be retired in the same manner as discussed above in connection with act 351 (FIG. 3). Again, this determination can be performed in any of numerous ways. For example, a system administrator may make this determination manually, or the source target locations may be retired automatically (e.g., in response to a user preference that was previously established). When it is determined in act 665 that the source storage locations should be retired, the process proceeds to act 667, wherein the process performs the retirement, and then terminates. When it is determined in act 665 that the source locations should not be retired, the process terminates.

When it is determined at act 663 that the data migration should not be finalized, the process proceeds to act 669, wherein a mirroring relationship is initialized so that all writes to the data set are mirrored to the source storage locations. This facilitates the possible undoing of the migration as discussed below, by ensuring that the source volume(s) are accurate mirrors of the target volume(s). In the embodiment shown in FIG. 6, the process for performing an undo of the data migration initiates a mirroring relationship in act 669, but does not perform the actual mirroring of the data itself, as this can be implemented by another process or utility. It should be appreciated that the present invention is not limited in this respect, and that the reference to the undo process mirroring data can refer to either the establishing of a mirroring relationship to be performed by another process, or the undo process can perform the mirroring of the data itself.

After the mirroring relationship is initialized, the process proceeds to act 670, wherein the applications are switched to the target(s). As discussed above with reference to act 664, the act of switching the applications can be performed in any of numerous ways.

Next, the process proceeds to act 671, wherein a determination is made as to whether to undo the migration. Again, this act can be performed in any of numerous ways, as the present invention is not limited to any particular implementation technique. In accordance with one embodiment of the present invention, this determination is made manually by a system administrator when it is determined that errors exist in the target configuration for the data set that has been migrated.

When it is determined at act 671 that the migration is not to be undone at a particular point in time, the process proceeds to act 672 to again determine whether the migration should be finalized. As with the determination at act 663, this determination may be performed in any of numerous ways. When it is determined at act 672 that the migration should be finalized, the process proceeds to act 665, wherein the process determines whether the source storage locations should be retired (as discussed above), optionally retires the source, and then terminates.

When the process determines at act 672 that the migration should not be finalized, the process returns to act 671. In this manner, the process loops through acts 671 and 672 until a determination is made either at act 671 to undo the migration, or at act 672 to finalize the migration.

When it is determined at act 671 that the migration is to be undone, the process proceeds to act 675, wherein the process determines whether to abandon the migration. In this respect, it should be appreciated that when errors are identified in a target configuration, a system administrator might simply seek to correct certain errors rather than abandoning the entire migration. This is facilitated in the embodiment of the invention shown in FIG. 6.

When it is determined at act 675 that the target configuration for the data set is to be abandoned, the process proceeds to act 676, wherein the applications that access the data set are switched back to the source storage locations. This can be performed in any of numerous ways, as this aspect of the present invention is not limited to any particular implementation technique. For example, when the migration is performed using the embodiment of the invention illustrated in FIG. 3, the act 676 can be performed in a manner analogous to the automatic redirection in act 349 of FIG. 3, but wherein the steps performed to initiate the redirection are essentially undone, so that the access requests pass to the source storage locations. Of course, numerous other techniques can also be employed, including manual reconfiguration techniques.

After the switch to the source is complete, the process proceeds to act 677, wherein it determines whether the target storage locations should be retired. If so, the process proceeds to act 680, wherein the target locations are retired, and then terminates. The act of retiring the target storage locations is analogous to retiring the source storage locations, and can be performed in any of numerous ways, as discussed above. When the process determines that the target storage locations should not be retired, the process simply terminates. The process may determine that the target storage locations should not be retired for any of numerous reasons. For example, a system administrator may wish to examine the data at the target storage locations to diagnose errors with the migration, so that it can be attempted again at a later time.

When it is determined at act 675 that the target configuration of the data set is not to be abandoned, the process proceeds to act 678, wherein all writes to the data set that are directed to the source storage locations are mirrored to the target locations. In this manner, the target is maintained as an accurate mirror of the source, thereby keeping available the option to reinstate the migration by switching to the target in the future without re-migrating the data set. The process then proceeds to act 679, wherein the applications that access the data set are switched back to the source storage locations. This can be performed in any of numerous ways, as this aspect of the present invention is not limited to any particular implementation technique. For example, when the migration is performed using the embodiment of the invention illustrated in FIG. 3, the act 679 can be performed in a manner analogous to the automatic redirection in act 349 of FIG. 3, but wherein the steps performed to initiate the redirection are essentially undone, so that the access requests pass to the source storage locations. Of course, numerous other techniques can also be employed, including manual reconfiguration techniques. In this respect, it should be appreciated that the present invention is not limited to modifying the same aspect of the computer system that was modified to switch from the source(s) to the target(s) when switching back to the source(s), as different aspects of the computer system can be modified in this respect.

The process then returns to act 661, wherein the process will take no further action until it determines (in act 661) to switch the applications to the target storage locations, or determines (in act 662) to abandon the target, as discussed above. In this manner, the target data set will be maintained as an up-to-date copy of the source data set. Thereafter, a decision can be made by the system administrator to either attempt to switch over to the target storage locations again, in a manner similar to that discussed above, or to simply abandon the target storage locations so that the mirroring to the target storage locations can cease, and the target storage locations can optionally be retired.

It should be appreciated that FIG. 6 depicts one illustrative embodiment of a process used to undo a migration, and that other embodiments may include acts different from those described, acts which are performed in a different order, and/or acts which are performed in parallel.

VII. POLICY-BASED OPEN

As discussed above, embodiments of the present invention can be employed on computer systems including multiple paths extending between the host computer and the storage system. As further described above, in some multi-path systems (e.g., those employing the PowerPath filter driver available from EMC Corporation) pseudo-names are employed to provide a common representation for all paths over which a particular volume is accessible, whereas distinct native names are provided for each instance of a path that accesses the logical volumes. In some embodiments of the present invention discussed above, various actions are taken in response to an access request directed to a particular volume, and may be triggered by an access request directed to a particular pseudo-name. For example, the examples of the redirection techniques described above may redirect an I/O request directed to a particular pseudo-name at a source location to a corresponding target location. Similarly, in other embodiments that employ a technique for maintaining state information of portions of a data set that have been migrated, write operations directed to the pseudo-names of any source volumes that have already been migrated are duplicated to the corresponding target volumes to maintain consistency.

As should be appreciated from the foregoing, in accordance with several embodiments of the present invention, various techniques that are performed to achieve a successful migration respond to I/O requests directed to a particular source volume, and in particular identify I/O requests that refer to the source volume using its pseudo-name. It should be appreciated that if an I/O request was directed directly to a native name for a source volume on which one of these actions should take place, it could result in errors in the migration process. For example, if an I/O request directed to a native name for a source volume that was previously migrated was not redirected to the corresponding target volume, it would result in an access to the wrong volume. Similarly, if a write request to a native name for a source volume was not duplicated to the corresponding target volume, the corresponding target volume would never be updated, resulting in an improper data set after the migration is completed and access is redirected to the target volumes.

In accordance with one embodiment of the present invention, the above-described situations are avoided by employing a policy-applying capability in the I/O path to evaluate I/O requests. In one embodiment of the present invention, such a policy is applied whenever an I/O request seeks to perform an open on a native name. In one embodiment, the policy will simply fail any attempt to open a native name, so that the data integrity problems that could result from an access to the native name for a source volume are avoided. Alternatively, in another embodiment of the present invention, the policy responds to a request to open a native name by opening the corresponding pseudo-name, so that the native name cannot directly be opened, and so that all I/O requests directed to the volume will be performed using the pseudo-name. As a result, the above-described migration facilities will recognize access requests to the pseudo-name and take the appropriate actions.

In the embodiments described above, the policy is applied only in response to an I/O request that seeks to open a particular volume. It should be appreciated that when an open is performed on a particular volume, the I/O stack of the host computer will typically return a short-hand identifier (commonly referred to as a handle) for the volume to the application that performed the open, such that subsequent I/O requests directed to that volume will use the handle as the identifier. Thus, for the embodiment wherein the policy responds to an open request by opening a different volume (e.g., the embodiment that opens a corresponding pseudo-name rather than a requested native name is considered to open a different volume because the native names and pseudoname have distinct volume identifiers), the policy can cause the handle for the substituted volume (e.g., the pseudo-name in the example above) to be returned to the application, such that subsequent I/O requests will automatically be transmitted to the substituted volume, without having to apply the policy to each subsequent I/O request. Thus, applying the policy only for an I/O request that performs an open is sufficient, and an efficient manner of applying the policy. However, it should be appreciated that the aspect of the present invention that applies a policy to an I/O request is not limited to applying a policy to open requests, as it can be employed with any type of I/O request.

The embodiment of the present invention that applies a policy in response to a I/O request can be implemented in any of numerous ways, as the present invention is not limited to any particular implementation technique. In one embodiment of the present invention that applies a policy to open requests, the policy can be implemented in the I/O stack (e.g., in the top of the stack in the platform-dependent code that responds to open requests), and can include one or more data structures that can include information that defines the policy to be applied. Other implementations are also possible.

It should be appreciated that the aspect of the present invention that applies a policy to an I/O request is not limited to applying policies to handle access requests to a native name, to providing a policy to facilitate migration applications, or to applying a policy that either fails or redirects an I/O request when a specified condition is met. Rather, the aspect of the present invention that assigns a policy to an I/O request can be employed in numerous other ways, to support numerous other applications, and can take any suitable action when a specified condition is met.

In another embodiment of the present invention, the use of a policy that applies to an I/O request can be employed as an alternate technique for executing the switch of one or more applications from the source volume(s) to the target volume(s) following a migration. In this respect, a policy can be employed that, in response to a request to open a source volume after a data set has been migrated, substitutes a corresponding target volume and returns the handle for the target volume which can then be used for all read and write access requests. In this manner, after the data set has been migrated, the application can be temporarily shut down, and then reinitialized, which will cause the application to go through a process of again opening the volumes accessed thereby. In accordance with one embodiment of the present invention, the policy can use information relating to whether or not the migration has been completed as a condition for determining whether to, in response to an open request to a source volume, return the handle for that source volume, or to substitute the handle for the corresponding target volume. Thus, when the application is shut down and then reinitialized after the migration, the policy will cause the handles for the target volume(s) to be returned to the application in place of handles for the source volume(s), to thereby implement the switch from the source volume(s) to the target volume(s). It should be appreciated that although the application program is temporarily shut down and then reinitialized so that it can re-open its volumes, the application program need not be re-configured, such that the switch from the source volume(s) to the target volume(s) can be performed in a manner that is transparent to the application.

It should further be appreciated that the above-described embodiment of the present invention directed to open-based switching differs from the switching technique discussed above wherein I/O requests are redirected from a source volume to a target volume. In accordance with that redirection technique, the I/O requests are directed to the handle for the source volume(s) and those requests are redirected to the target volume(s). Conversely, in the embodiment wherein a policy is employed to respond to an open request by substituting a different handle than the one requested, subsequent I/O read and write requests are directed to the source volume(s) directly and are not redirected.

The embodiment of the present invention related to a policy-based open is not limited in any manner to the criteria that the policy can evaluate in making a determination, nor in the types of actions that can be performed. In one of the examples discussed above, a potential problem that is solved by performing a policy-based open relates to a multi-path system, wherein access requests directed to a volume are to be redirected, but wherein the redirection technique acts only upon a pseudoname, so that access requests to a native name can escape the desired redirection. Numerous other policies and resulting actions can be employed in connection with such a multi-path system.

For example, the collection of native names and corresponding pseudoname for a particular volume can be considered to constitute a group of identifiers. In accordance with one embodiment of the present invention, a policy can be employed that enables only one of the identifiers to be opened, such that if a subsequent open request attempts to open a second identifier in the group, that subsequent open attempt will fail. Alternatively, rather than failing a subsequent open request, the policy could return the handle for the identifier within the group that has already been opened, such that only a single identifier in the group can ever be opened (i.e., have its handle returned) at one particular time. As a further variant, rather than the policy always returning the handle for a first-opened identifier in the group, the policy can, in response to an open request to any identifier in the group, always return the handle of a predetermined member of the group (e.g., the pseudoname). As should be appreciated from the various implementations discussed above, any of numerous policies can be employed that can ensure that only a single identifier from among a group all corresponding to a single volume can be opened at a time. This embodiment of the invention is particularly useful when employed in a system wherein other facilities of the system track I/O requests to a volume to take certain actions (e.g., such as the redirection techniques referred to above), because by limiting the number of identifiers that must be tracked by such facilities, the overhead associated with such facilities is reduced.

It should be appreciated that the embodiment of the present invention that relates to applying a policy to an open or other I/O request should be distinguished from the authentication and authorization that conventionally takes place when a user seeks to access a particular logical volume. In this respect, conventional security techniques typically authenticate a request from a user to verify the identity of the user, and then apply certain access permissions to determine whether the user is (either solely or as a member of an authorized group) authorized to perform the requested actions. It should be appreciated that the types of policies referred to herein are not a substitute for conventional authentication and authorization techniques, but rather are an additional level of authorization imposed in accordance with one embodiment of the present invention. As should be appreciated from several of the examples discussed above, in accordance with one embodiment of the present invention, a request may pass authentication and a conventional authorization check that will enable the user to perform a particular, function on a volume (e.g., a user seeking to open a native name with write privileges in one of the examples discussed above), but the request may nevertheless be denied because of a policy imposed in accordance with one embodiment of the present invention.

It should be appreciated that various types of control commands (commonly referred to as IOCTL commands) are analogous in many ways to an open command. The above-described techniques for imposing a policy in response to an open can similarly be employed in connection with an IOCTL command, such that a policy can be employed for such commands to take any of the numerous actions discussed above (e.g., returning the handle of device different than the one identified in the request).

It should be appreciated that in one embodiment of the present invention, a policy can be employed that is identity-independent, such that authorization to perform an action on a volume can be denied (or a different volume can be substituted) in response solely to the nature of the action requested, independent of the identity of the requester). For example, in the above-discussed example wherein a policy is employed to prevent access to a native name, the policy is identity-independent, such that all attempts to access a native name will be denied (or the pseudoname will be substituted) regardless of the identity of the requestor. This is to be distinguished from conventional authorization techniques, which typically examine permission information specific to a requester, such that the identity of a requester is a factor in determining whether the request is authorized (e.g., some users may be authorized to write to a particular volume, while others are not).

Conventional techniques for providing authorization for a user typically provide the ability for a particular user to read a volume of data, write the volume of data, execute an IOCTL command directed to the volume of data, or execute an executable file contained within the volume of data (the ability to execute an executable file is typically treated as a special type of read, as most privilege schemes allow a user with read access privileges to execute the file). In accordance with one embodiment of the present invention, a policy can be applied that provides other types of permissions, rather than simply giving a user access to read, write, execute or issue an IOCTL command to a volume.

Another application for the embodiment of the present invention directed to applying a policy and substituting a handle for a different volume in response to an open request involves an alternative to the above-described technique for redirecting I/O requests. For example, rather than redirecting an I/O request, wherein an application issues an I/O request to the handle for a specified volume and some facility within the system redirects the I/O request to a different volume, a similar result can be achieved by performing a policy-based open that performs a substitution of one handle for another, so that I/O requests then are issued directly to the desired volume. Like the redirection of I/O requests discussed above, the use of a policy to substitute one handle for another also can be performed in a manner that is transparent to the application.

An illustrative system in which this embodiment of the present invention can be employed relates to a configuration wherein a host computer is coupled to two different storage systems that are interconnected via a remote data mirroring facility (e.g., such as the above-mentioned SRDF available from EMC Corporation). In such a configuration, it may be desirable (e.g., for performance reasons) to make the remotely mirrored volume accessible for reads to one or more users on the host (e.g., those that have a particularly high priority). Thus, according to one embodiment of the present invention, such high-priority users could have reads to the primary volume on one storage system sent to the mirrored volume on another, which may provide for improved performance if the remote volume and/or its storage system is less heavily utilized. For example, a policy can be employed that recognizes a request to open the primary volume from a high-priority application and substitutes the handle for the mirrored volume in place of the handle for the primary volume that the application seeks to access. It should be appreciated that the policy can make a determination based on any desired criteria, including the identity of a user. Thus, requests to open the primary volume may be passed directly through for some users so that the handle for that primary volume is returned, while for other users the policy may substitute a different handle (such as the handle for the mirrored volume).

VIII. CONCLUSION

It should also be appreciated that the embodiments of the present invention described herein can be used to migrate logical objects that are not limited to a single set of logically related data. For example, the logical objects being migrated may comprise mirrors of some or all of the data set. The embodiments of the present invention described herein can be used to migrate a set of logically related data and a mirror of that set to a target location that is identically mirrored, or has a different (e.g., non-mirrored) configuration.

The present invention is not limited to migrating a logical object stored at a source location comprising contiguous storage. A logical object dispersed across non-contiguous storage may be migrated to similarly non-contiguous target storage, to contiguous storage, or to a combination thereof. Similarly, logical objects stored in contiguous storage may be moved to non-contiguous storage, contiguous storage, or a combination thereof.

The present invention is not limited to migrating a logical object to target physical storage devices that replicate the source physical storage devices. For example, a logical object might be moved to a target location which facilitates faster physical access because of its placement on the disk(s). A logical object can also be migrated to a target location which is laid out differently across one or more arrays of disks, such as might be done to accommodate a different redundancy (e.g., RAID) technique and/or subsystem.

The processes discussed above are not limited to the sequential execution of the above-described acts. In some embodiments, certain acts may be performed in parallel or may be re-ordered.

The above-described embodiments of the present invention can be implemented in any of numerous ways. For example, the above-discussed functionality can be implemented using hardware, software or a combination thereof. When implemented in software, the software code can be executed on any suitable processor or collection of processors, whether provided in a single computer or distributed among multiple computers. It should further be appreciated that any component or collection of components that perform the functions described above can be generically considered as one or more controllers or processors that control the above-discussed functions. The one or more controllers or processors can be implemented in numerous ways, such as with dedicated hardware, or with general purpose hardware that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer system resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user), in the manners described above.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of migrating a logical object comprising a plurality of logically associated data elements from at least one first storage location at which the logical object is stored to at least one second storage location, the logical object storing data accessible to an application program, the method comprising computer-implemented acts of:

(A) in response to receipt of at least one instruction to migrate the logical object, automatically provisioning the at least one second storage location to service the logical object, the act of automatically provisioning comprising identifying the at least one second storage location and configuring the at least one second storage location to store the logical object;

(B) moving the data stored within the logical object from the at least one first storage location to the at least one second storage location;

(C) after completion of the act (B), automatically servicing access requests from the application program directed to the logical object from the at least one second storage location; and (D) maintaining availability of the logical object to service access requests from the application program during the act (B).

2. The method of claim 1, wherein the act (B) includes an act of copying the data stored in the logical object from the at least one first storage location to the at least one second storage location.

3. The method of claim 1, wherein the act (D) includes an act of maintaining availability of the logical object to service access requests from the application program during acts (A), (B) and (C).

4. The method of claim 1, wherein the acts (A), (B) and (C) are performed in response to a single instruction to migrate the logical object.

5. The method of claim 1, wherein the method is performed in a computer system including at least one host computer and at least one storage system, wherein the at least one first storage location is provided in at least one first logical volume and the at least one second storage location is provided in at least one second logical volume, each of the logical volumes being presented by the at least one storage system to the at least one host computer and each being perceived by the at least one host computer as corresponding to a physical storage device, and wherein the act (B) includes an act of moving the data from the at least one first logical volume to the at least one second logical volume.

6. The method of claim 5, wherein the act (B) includes an act of creating at least one mirror between the at least one first logical volume and the at least one second logical volume and synchronizing the at least one mirror.

7. The method of claim 5, wherein the act (B) includes an act of creating at least one hardware mirror between the at least one first logical volume and the at least one second logical volume and synchronizing the at least one mirror.

8. The method of claim 5, wherein the act (C) includes an act of automatically redirecting access requests directed to the at least one first logical volume to the at least one second logical volume.

9. The method of claim 8, further comprising an act of, during the act (B), mirroring to the at least one second logical volume all writes to the at least one first logical volume.

10. The method of claim 5, further comprising an act of:
(E) retiring the at least one first logical volume upon completion of the act (C) so that the at least one first logical volume is no longer accessible.

11. The method of claim 5, wherein the at least one storage system includes first and second storage systems, wherein the at least one first logical volume is stored on the first storage system and the at least one second logical volume is stored on the second storage system.

12. The method of claim 5, wherein the at least one host computer includes at least one logical volume manager (LVM) that is assigned the at least one first logical volume and the at least one second logical volume, and wherein the act (B) is performed by the LVM.

13. The method of claim 5, wherein the act (A) includes an act of assigning data elements stored in the at least one first logical volume to physical addresses in the at least one second logical volume.

14. The method of claim 5, wherein the act (A) includes an act of configuring at least one switch through which the at least one host computer communicates with the at least one second logical volume.

15. The method of claim 1, wherein the act (D) includes an act of maintaining availability of the logical object to service write requests from the application program during the act (B).

16. The method of claim 1, wherein the act (B) is initiated automatically in response to completion of the act (A) and the act (C) is initiated automatically in response to completion of the act (B).

17. The method of claim 1, wherein the acts (A), (B), (C) and (D) are performed in a manner transparent to the application program.

18. The method of claim 1, wherein the logical object includes at least a portion of a database.

19. The method of claim 1, wherein the logical object includes a file system.

20. The method of claim 1, wherein the at least one first location includes a plurality of non-contiguous storage locations.

21. The method of claim 1, wherein the at least one second location includes a plurality of non-contiguous storage locations.

22. The method of claim 1, wherein the method is performed in a computer system including at least one host computer and at least one storage system, wherein the application program executes on the at least one host computer, and wherein the method is performed by at least one utility executing on the computer system.

23. The method of claim 1, further including an act of, following completion of the act (C), performing all writes to the logical object at both the at least one first storage location and the at least one second storage location.

24. At least one computer-readable medium with instructions encoded thereon for performing a method of migrating a logical object comprising a plurality of logically associated data elements from at least one first storage location at which the logical object is stored to at least one second storage location, the logical object storing data accessible to an application program, the method comprising acts of:

(A) in response to receipt of at least one instruction to migrate the logical object, automatically provisioning the at least one second storage location to service the logical object, the act of automatically provisioning comprising identifying the at least one second storage location and configuring the at least one second storage location to store the logical object;
(B) moving the data stored within the logical object from the at least one first storage location to the at least one second storage location;
(C) after completion of the act (B), automatically servicing access requests from the application program directed to the logical object from the at least one second storage location; and
(D) maintaining availability of the logical object to service access requests from the application program during the act (B).

25. The at least one computer-readable medium of claim 24, wherein the act (B) includes an act of copying the data stored in the logical object from the at least one first storage location to the at least one second storage location.

26. The at least one computer-readable medium of claim 24, wherein the act (D) includes an act of maintaining availability of the logical object to service access requests from the application program during acts (A), (B) and (C).

27. The at least one computer-readable medium of claim 24, wherein the acts (A), (B) and (C) are performed in response to a single instruction to migrate the logical object.

28. The at least one computer-readable medium of claim 24, wherein the method is performed in a computer system including at least one host computer and at least one storage system, wherein the at least one first storage location is provided in at least one first logical volume and the at least one second storage location is provided in at least one second logical volume, each of the logical volumes being presented by the at least one storage system to the at least one host computer and each being perceived by the at least one host computer as corresponding to a physical storage device, and wherein the act (B) includes an act of moving the data from the at least one first logical volume to the at least one second logical volume.

29. The at least one computer-readable medium of claim 28, wherein the act (B) includes an act of creating at least one mirror between the at least one first logical volume and the at least one second logical volume and synchronizing the at least one mirror.

30. The at least one computer-readable medium of claim 28, wherein the act (B) includes an act of creating at least one hardware mirror between the at least one first logical volume and the at least one second logical volume and synchronizing the at least one mirror.

31. The at least one computer-readable medium of claim 28, wherein the act (C) includes an act of automatically redirecting access requests directed to the at least one first logical volume to the at least one second logical volume.

32. The at least one computer-readable medium of claim 31, wherein the method further comprises an act of, during the act (B), mirroring to the at least one second logical volume all writes to the at least one first logical volume.

33. The at least one computer-readable medium of claim 28, wherein the method further comprising an act of:
(E) retiring the at least one first logical volume upon completion of the act (C) so that the at least one first logical volume is no longer accessible.

34. The at least one computer-readable medium of claim 28, wherein the at least one storage system includes first and second storage systems, wherein the at least one first logical volume is stored on the first storage system and the at least one second logical volume is stored on the second storage system.

35. The at least one computer-readable medium of claim 28, wherein the at least one host computer includes at least one logical volume manager (LVM) that is assigned the at least one first logical volume and the at least one second logical volume, and wherein the act (B) is performed by the LVM.

36. The at least one computer-readable medium of claim 28, wherein the act (A) includes an act of assigning data elements stored in the at least one first logical volume to physical addresses in the at least one second logical volume.

37. The at least one computer-readable medium of claim 28, wherein the act (A) includes an act of configuring at least one switch through which the at least one host computer communicates with the at least one second logical volume.

38. The at least one computer-readable medium of claim 24, wherein the act (D) includes an act of maintaining availability of the logical object to service write requests from the application program during the act (B).

39. The at least one computer-readable medium of claim 24, wherein the act (B) is initiated automatically in response to completion of the act (A) and the act (C) is initiated automatically in response to completion of the act (B).

40. The at least one computer-readable medium of claim 24, wherein the acts (A), (B), (C) and (D) are performed in a manner transparent to the application program.

41. The at least one computer-readable medium of claim 24, wherein the logical object includes at least a portion of a database.

42. The at least one computer-readable medium of claim 24, wherein the logical object includes a file system.

43. The at least one computer-readable medium of claim 24, wherein the at least one first location includes a plurality of non-contiguous storage locations.

44. The at least one computer-readable medium of claim 24, wherein the at least one second location includes a plurality of non-contiguous storage locations.

45. The at least one computer-readable medium of claim 24, wherein the method is performed in a computer system including at least one host computer and at least one storage system, wherein the application program executes on the at least one host computer, and wherein the method is performed by at least one utility executing on the computer system.

46. The at least one computer-readable medium of claim 24, wherein the method further includes an act of, following completion of the act (C), performing all writes to the logical object at both the at least one first storage location and the at least one second storage location.

47. An apparatus for migrating a logical object comprising a plurality of logically associated data elements from at least one first storage location at which the logical object is stored to at least one second storage location, the logical object storing data accessible to an application program, the apparatus comprising at least one processor programmed to:
in response to receipt of at least one instruction to migrate the logical object, automatically provision the at least one second storage location to service the logical object, the automatic provisioning comprising identifying the at least one second storage location and configuring the at least one second storage location to store the logical object;
move the data stored within the logical object from the at least one first storage location to the at least one second storage location;
after the move of the data, automatically service access requests from the application program directed to the logical object from the at least one second storage location; and
maintain availability of the logical object to service access requests from the application program during the move of the data.

48. The apparatus of claim 47, wherein the at least one processor is programmed to copy the data stored in the logical object from the at least one first storage location to the at least one second storage location.

49. The apparatus of claim 47, wherein the at least one processor is programmed to maintain availability of the logical object to service access requests from the application program during the migration of the logical object.

50. The apparatus of claim 47, wherein the at least one processor is programmed to perform the migration of the logical object in response to a single instruction to migrate the logical object.

51. The apparatus of claim 47, wherein the migration of the logical object is performed in a computer system including at least one host computer and at least one storage system, wherein the at least one first storage location is provided in at least one first logical volume and the at least one second storage location is provided in at least one second logical volume, each of the logical volumes being presented by the at least one storage system to the at least one host computer and each being perceived by the at least one host computer as corresponding to a physical storage device, and wherein the at least one processor is programmed to move the data from the at least one first logical volume to the at least one second logical volume.

52. The apparatus of claim 51, wherein the at least one processor is programmed to create at least one mirror between the at least one first logical volume and the at least one second logical volume and synchronize the at least one mirror.

53. The apparatus of claim 51, wherein the at least one processor is programmed to create at least one hardware mirror between the at least one first logical volume and the at least one second logical volume and synchronize the at least one mirror.

54. The apparatus of claim 51, wherein the at least one processor is programmed to automatically redirect access requests directed to the at least one first logical volume to the at least one second logical volume.

55. The apparatus of claim 54, wherein the at least one processor is programmed to, during the move of the data, mirror to the at least one second logical volume all writes to the at least one first logical volume.

56. The apparatus of claim 51, wherein the at least one processor is programmed to retire the at least one first logical volume upon completion of the automatic service of access requests from the application program directed to the logical object from the at least one second storage location so that the at least one first logical volume is no longer accessible.

57. The apparatus of claim 51, wherein the at least one storage system includes first and second storage systems, wherein the at least one first logical volume is stored on the first storage system and the at least one second logical volume is stored on the second storage system.

58. The apparatus of claim 51, wherein the at least one host computer includes at least one logical volume manager (LVM) that is assigned the at least one first logical volume and the at least one second logical volume, and wherein the at least one processor is programmed to perform the move of the data stored within the logical object from the at least one first storage location to the at least one second storage location using the LVM.

59. The apparatus of claim 51, wherein the at least one processor is programmed to assign data elements stored in the at least one first logical volume to physical addresses in the at least one second logical volume.

60. The apparatus of claim 51, wherein at least one processor is programmed to configure at least one switch through which the at least one host computer communicates with the at least one second logical volume.

61. The apparatus of claim 47, wherein the at least one processor is programmed to maintain availability of the logical object to service write requests from the application program during the move of the data.

62. The apparatus of claim 47, wherein the at least one processor is programmed to automatically initiate the move of the data stored within the logical object from the at least one first storage location to the at least one second storage location in response to completion of the automatic provisioning of the at least one second storage location to service the logical object, and the automatic service of access requests from the application program directed to the logical object from the at least one second storage location is initiated automatically in response to completion of the move of the data stored within the logical object from the at least one first storage location to the at least one second storage location.

63. The apparatus of claim 47, wherein the migration of the logical object is performed in a manner transparent to the application program.

64. The apparatus of claim 47, wherein the logical object includes at least a portion of a database.

65. The apparatus of claim 47, wherein the logical object includes a file system.

66. The apparatus of claim 47, wherein the at least one first location includes a plurality of non-contiguous storage locations.

67. The apparatus of claim 47, wherein the at least one second location includes a plurality of non-contiguous storage locations.

68. The apparatus of claim 47, wherein the migration of the logical object is performed in a computer system including at least one host computer and at least one storage system, wherein the application program executes on the at least one host computer, and wherein the at least one processor is programmed to perform the migration of the logical object using at least one utility executing on the computer system.

69. The apparatus of claim 47, wherein the at least one processor is programmed to, after initiating the automatic service of access requests from the application program directed to the logical object from the at least one second storage location, perform all writes to the logical object at both the at least one first storage location and the at least one second storage location.

* * * * *